(12) United States Patent
Hasegawa

(10) Patent No.: US 8,223,428 B2
(45) Date of Patent: Jul. 17, 2012

(54) MICROSCOPE

(75) Inventor: Kazuhiro Hasegawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 18 days.

(21) Appl. No.: 12/951,298

(22) Filed: Nov. 22, 2010

(65) Prior Publication Data

US 2011/0063724 A1    Mar. 17, 2011

Related U.S. Application Data

(63) Continuation-in-part of application No. 12/497,058, filed on Jul. 2, 2009.

(30) Foreign Application Priority Data

| Jul. 4, 2008 | (JP) | 2008-175584 |
| Jun. 2, 2009 | (JP) | 2009-133451 |
| Mar. 26, 2010 | (JP) | 2010-073562 |

(51) Int. Cl.
  *G02B 21/00* (2006.01)

(52) U.S. Cl. ..................................... 359/381

(58) Field of Classification Search .......... None
  See application file for complete search history.

(56) References Cited

U.S. PATENT DOCUMENTS

| 2,264,835 A | 12/1941 | Flint |
| 2,977,848 A * | 4/1961 | Malfeld ........................ 359/381 |
| 4,363,532 A | 12/1982 | Weber |
| 4,565,427 A | 1/1986 | Schilling et al. |
| 4,726,653 A | 2/1988 | Thaler et al. |
| 5,867,310 A | 2/1999 | Hasegawa |
| 6,359,731 B1 | 3/2002 | Koyama |
| 6,504,964 B1 * | 1/2003 | Hasegawa ...................... 385/16 |
| 2005/0195475 A1 | 9/2005 | Obuchi |
| 2011/0063724 A1 | 3/2011 | Hasegawa |

FOREIGN PATENT DOCUMENTS

| JP | 57-23244 A | 5/1982 |
| JP | 59-104616 A | 6/1984 |
| JP | 8-220443 A | 8/1996 |
| JP | 2000-338417 A | 12/2000 |
| JP | 2010-033025 A | 2/2010 |

OTHER PUBLICATIONS

U.S. Office Action dated Jul. 20, 2011 (in English) in parent U.S. Appl. No. 12/497,058.
U.S. Office Action dated Feb. 22, 2012 issued in parent U.S. Appl. No. 12/497,058, of which the present application is a Continuation in Part (CIP).

* cited by examiner

*Primary Examiner* — Derek S Chapel
(74) *Attorney, Agent, or Firm* — Holtz, Holtz, Goodman & Chick P.C.

(57) ABSTRACT

A microscope includes a microscope main body, a revolving nosepiece rotatably mounted on the microscope main body and equipped with plural objective lenses, and focusing handles that adjust focal points of the objective lenses. The microscope further includes operation knobs mounted in a vicinity of the focusing handles and configured to move by a predetermined amount in a predetermined direction, and an operating-force transmitting mechanism provided between the operation knobs and the revolving nosepiece and configured to transmit, when the operation knobs move, operating force to the revolving nosepiece to cause the movable member to move so that the objective lenses can be switched from one to the other through a single moving operation of the operation knobs by the predetermined amount.

7 Claims, 31 Drawing Sheets

MICROSCOPE

CROSS-REFERENCE TO RELATED APPLICATIONS

This application is a continuation-in-part of U.S. patent application Ser. No. 12/497,058, filed on Jul. 2, 2009, which claims the benefit of priority from Japanese Patent Application No. 2008-175584, filed on Jul. 4, 2008, and Japanese Patent Application No. 2009-133451, filed on Jun. 2, 2009. This application is also based upon and claims the benefit of priority from Japanese Patent Application No. 2010-073562, filed on Mar. 26, 2010. Their disclosures are incorporated herein by reference.

BACKGROUND OF THE INVENTION

1. Field of the Invention

The present invention relates to a microscope capable of switching optical elements, such as objective lenses, from one to the other without disturbing operation posture for a focusing handle and a stage handle by operating an operation lever mounted near either the focusing handle or the stage handle, and to a microscope capable of preventing the objective lenses from coming into contact with a stage or a specimen when the objective lenses are switched.

2. Description of the Related Art

A microscope revolving nosepiece capable of switching objective lenses from one to the other without disturbing operation posture for a focusing handle has been developed. Such a revolving nosepiece includes a revolving-nosepiece body fixed to an underside of a lens barrel, a revolving-nosepiece rotating unit rotatably mounted on the revolving-nosepiece body and equipped with plural objective lenses, a knob arranged at a position near a focusing handle and distant from the revolving-nosepiece rotating unit and through which switching operation of the objective lenses is exerted, and a transmitting unit arranged between the knob and the revolving-nosepiece rotating unit and configured to transmit the switching operation of the objective lenses exerted through the knob to the revolving-nosepiece rotating unit.

The transmitting unit includes a rotation axis provided with the knob mounted on an end thereof, a drive pulley mounted on a base end side of the rotation axis, a driven pulley mounted on the revolving-nosepiece rotating unit, and a belt wound around the drive pulley and the driven pulley. Therefore, switching operation of the objective lenses is entered from the knob as rotation operation, and the entry of the rotation operation is transmitted from the drive pulley to the revolving-nosepiece rotating unit via the belt (see Japanese Patent Application Laid-open No. H8-220443).

Meanwhile, a microscope configured to switch objective lenses from one to the other by manual operation includes a click mechanism arranged between a revolving-nosepiece body and a revolving-nosepiece rotating unit so that the objective lenses can be accurately set (positioned) at stop positions. As shown in FIG. 5, a click mechanism 14 includes, for example, a click 15 mounted on the revolving-nosepiece body and a ball 16 mounted on the revolving-nosepiece rotating unit 12. The click 15 is a leaf spring mounted on a top surface of the revolving-nosepiece body and is structured such that both side edges 15a are obliquely bent so that the ball 16 can be put in from both sides and a groove 15b in which the ball 16 is to be fitted is arranged in the center of the click 15. The ball 16 is a hemispherical projection formed on a top surface of the revolving-nosepiece rotating unit 12 so as to correspond to the stop positions (switch positions) of the objective lenses. When the objective lenses are switched from one to the other, the ball 16 that has been fitted in the groove 15b of the click 15 is released from the groove 15b of the click 15, and then the ball 16 coming next is put in the click and fitted in the groove 15b of the click 15.

The microscope including the knob mounted near the focusing handle as described above is structured so that the objective lenses can be switched from one to the other by manual operation. Therefore, this microscope also includes the click mechanism 14. Thus, when the objective lenses are switched from one to the other by rotating the knob, the ball 16 that has been fitted in the groove 15b of the click 15 is released from the groove 15b of the click 15, and then the ball 16 coming next is put in the click 15 and fitted in the groove 15b of the click 15.

Japanese Patent Application Laid-open No. 2010-33025 discloses an inverted microscope in which a revolving-nosepiece operating unit, which is generally disposed under a stage and is thus not easily operable, is disposed near a focusing handle that is disposed at an easily operable position, and the magnitude of operating force of the revolving nosepiece is averaged to reduce the maximum magnitude of the operating force to thereby improve operability.

Furthermore, Japanese Patent Application Laid-open No. 2000-338417 discloses a structure in which a stage is stoppable at a predetermined position in a vertical direction only by pushing the stage downward, so that a specimen can be changed without contact with objective lenses even when the working distance of the objective lenses is short.

Moreover, Japanese Patent Application Laid-open No. S59-104616 discloses a microscope that includes an eccentric member disposed between a focusing transmission device and a stage holder so that a specimen can be moved quickly by the eccentric member.

SUMMARY OF THE INVENTION

A microscope according to an aspect of the present invention includes: a microscope main body; a movable member movably mounted on the microscope main body and equipped with a plurality of optical elements; a focusing operating unit that adjusts focal points of the optical elements; an optical-element switching operating unit mounted in a vicinity of the focusing operating unit and configured to move by a predetermined amount in a predetermined direction; and an operating-force transmitting mechanism provided between the optical-element switching operating unit and the movable member and configured to transmit, when the optical-element switching operating unit moves, an operating force to the movable member to move the movable member such that the optical elements are switched from one to the other through a single moving operation of the optical-element switching operating unit by the predetermined amount.

A microscope according to another aspect of the present invention includes: an objective-lens switching mechanism equipped with a plurality of objective lenses and configured to rotate to switch an objective lens positioned on an optical axis to other objective lens among the objective lenses; a stage for placing a specimen; a switching entering unit that enters driving force for rotating the objective-lens switching mechanism to switch the objective lenses; a retraction operation mechanism that, along with operation of the switching entering unit, performs retraction operation for increasing a relative distance between the objective-lens switching mechanism and the stage in an optical axis direction, maintaining operation for maintaining a state in which the relative distance is increased, and return operation for shortening the relative distance; and a sequential operation mechanism that is selectively driven along with the operation of the switching entering unit to thereby rotate the objective-lens switching mechanism for switching the objective lenses during the maintaining operation performed by the retraction operation mechanism.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a microscope according to the present invention will be described in detail below with reference to the accompanying drawings. The present invention is not limited to the following embodiments.

First Embodiment

A first embodiment of the present invention will be described below using an example in which an optical-element switching device of a microscope is applied to a revolving nosepiece.

Figure 1:
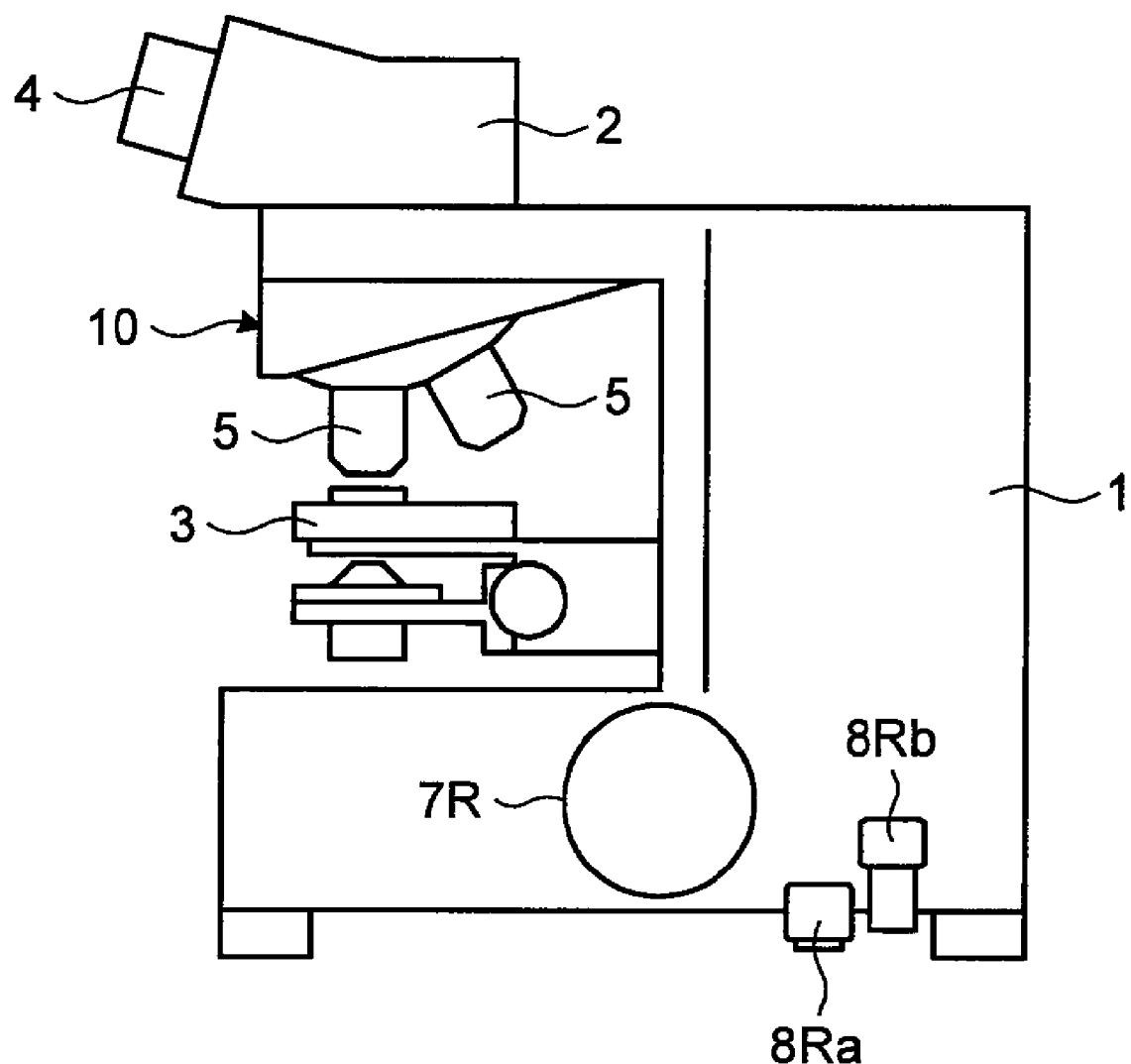
FIG. 1 is a right side view of a microscope according to a first embodiment of the present invention.
Figure 2:
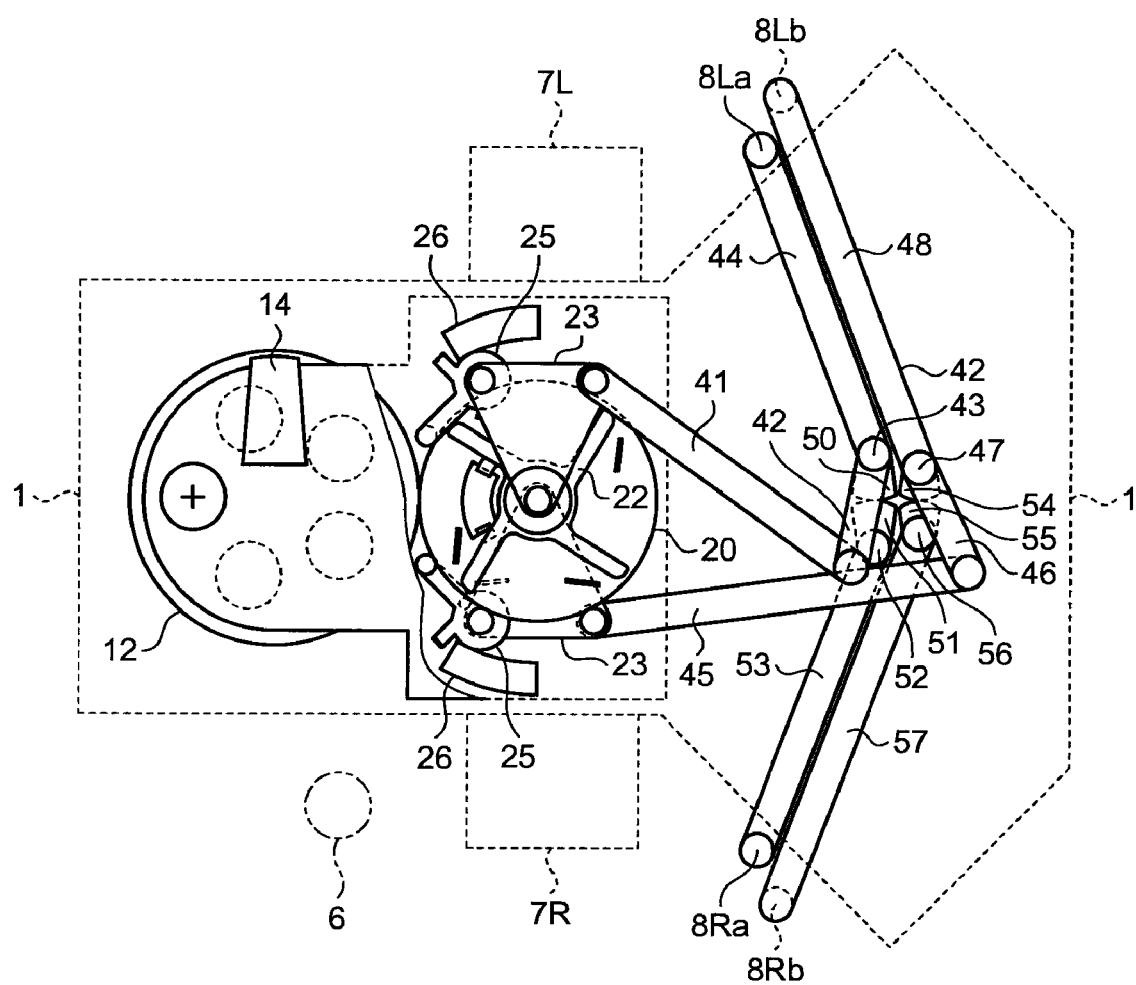
FIG. 2 is a plan view of the microscope according to the first embodiment.

An overview of a microscope according to the first embodiment is described below with reference to FIGS. 1 and 2. FIG. 1 is a right side view of the microscope according to the first embodiment. FIG. 2 is a plan view of the microscope according to the first embodiment.

As shown in FIGS. 1 and 2, the microscope in which the optical-element switching device is applied to a revolving nosepiece 10 includes a microscope main body 1, a lens barrel 2, and a stage 3. The lens barrel 2 is mounted on an end portion of an arm of the microscope main body 1 to enable observation of an image via an eyepiece 4. The stage 3 is configured to move in a horizontal direction (X-direction), a back-and-forth direction (Y-direction), and a vertical direction (Z-direction). More specifically, the stage 3 moves in the horizontal direction (X-direction) and the back-and-forth direction (Y-direction) by rotating a stage handle 6 mounted on a right side surface of the microscope main body 1, and moves in the vertical direction (Z-direction) by operating a focusing handle 7L mounted on a left side surface of the microscope main body 1 or a focusing handle 7R mounted on the right side surface of the microscope main body 1.

Figure 3:
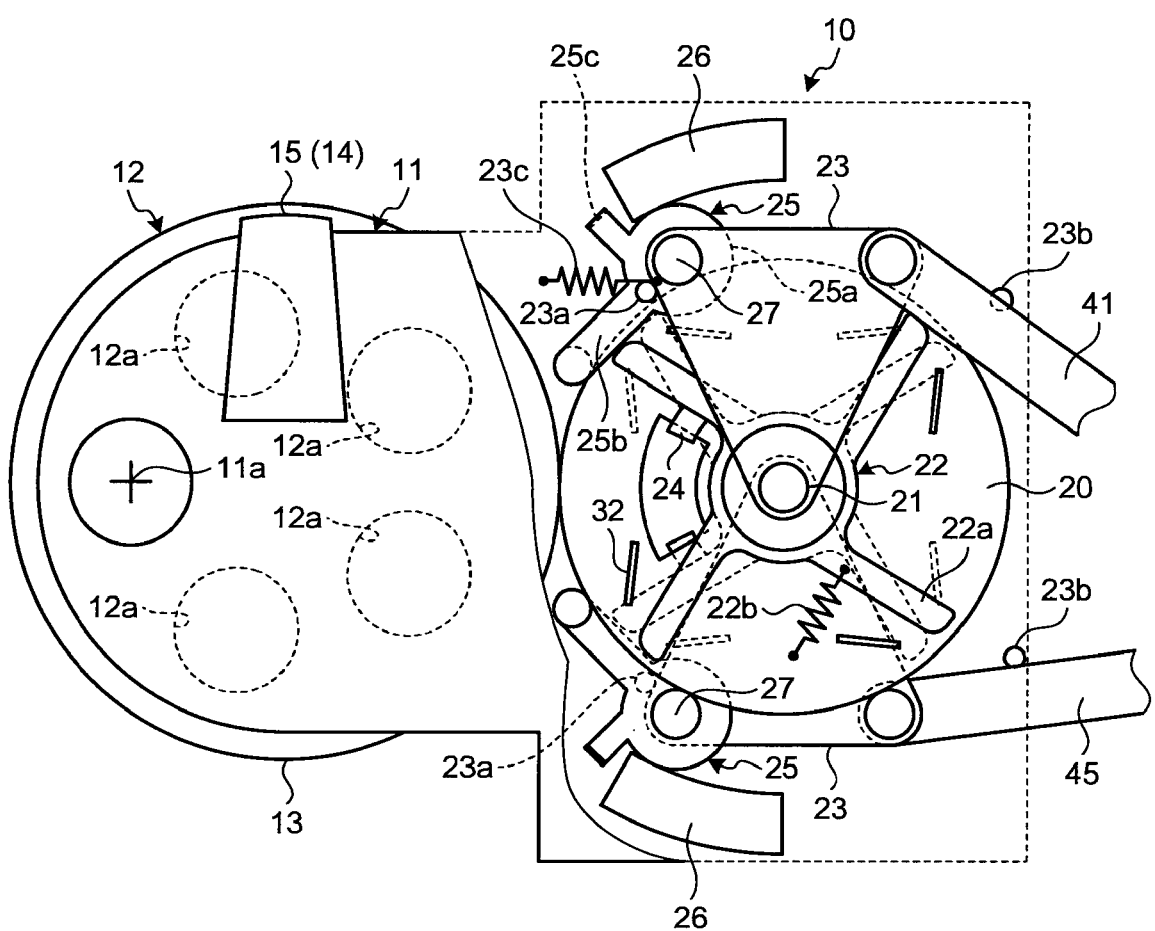
FIG. 3 is a plan view of a revolving nosepiece of the microscope according to the first embodiment.
Figure 4:
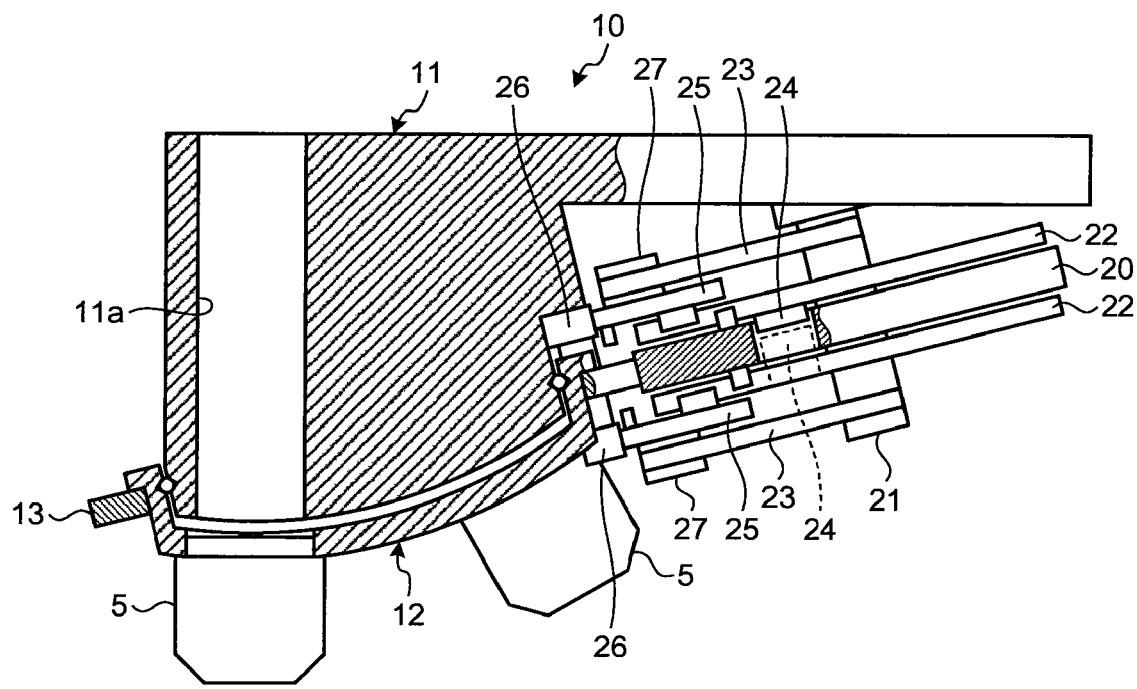
FIG. 4 is a sectional side view of the revolving nosepiece of the microscope according to the first embodiment.

The revolving nosepiece 10 of the microscope according to the first embodiment is described below with reference to FIGS. 3 and 4. FIG. 3 is a plan view of the revolving nosepiece 10 of the microscope according to the first embodiment. FIG. 4 is a sectional side view of the revolving nosepiece 10 of the microscope according to the first embodiment.

As shown in FIG. 4, the revolving nosepiece 10 of the microscope according to the first embodiment is configured to enable switching of objective lenses 5, and includes a revolving-nosepiece body (main body) 11 that is fixed to an underside of the end portion of the arm of the microscope main body 1 and the revolving-nosepiece rotating unit (movable member) 12 that is rotatably mounted on the revolving-nosepiece body 11.

An optical path 11a is formed in the revolving-nosepiece body 11 so that a light passing through the objective lenses 5 can be guided to the eyepiece 4 via the end portion of the arm of the microscope main body 1 and the lens barrel 2.

Plural objective lenses (optical elements) 5 can be mounted on the revolving-nosepiece rotating unit 12. Specifically, the revolving-nosepiece rotating unit 12 of the revolving nosepiece 10 of this embodiment is configured to have five objective lenses 5. More specifically, as shown in FIG. 3, screw holes 12a for mounting the objective lenses 5 are formed at positions on the same radius from the center of rotation of the revolving-nosepiece rotating unit 12 at regular intervals. Therefore, when the revolving-nosepiece rotating unit 12 is rotated one-fifth of a turn clockwise or counterclockwise in FIG. 3, the objective lenses 5 can be switched from one to the other.

As shown in FIG. 4, a driven gear 13 is formed on the circumference of the revolving-nosepiece rotating unit 12. The number of teeth on the driven gear 13 is set to a number divisible by the number of the objective lenses 5. In the first embodiment, the number of teeth on the driven gear 13 is set to a number divisible by five.

Figure 5:
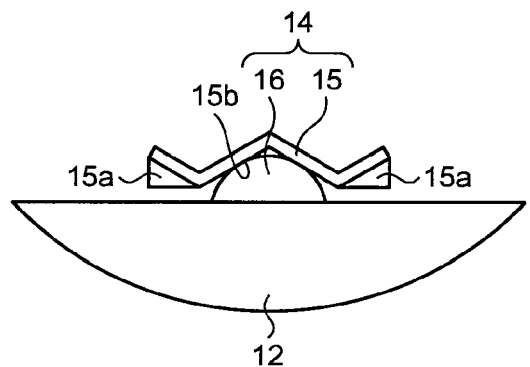
FIG. 5 is an enlarged side view of a click mechanism shown in FIG. 3.

As shown in FIG. 3, a click mechanism 14 is arranged between the revolving-nosepiece body 11 and the revolving-nosepiece rotating unit 12. The click mechanism 14 is configured to accurately stop the objective lenses 5 at stop positions. The click mechanism 14 of this embodiment includes, as shown in FIG. 5, the click 15 mounted on the revolving-nosepiece body 11 and the ball 16 mounted on the revolving-nosepiece rotating unit 12. The click 15 is a leaf spring mounted on a top surface of the revolving-nosepiece body 11 and structured such that the side edges 15a are obliquely bent so that the ball 16 can be put in from both sides and the groove 15b in which the ball 16 is to be fitted is arranged in the center of the click 15. The ball 16 is a hemispherical projection formed on a top edge surface of the revolving-nosepiece rotating unit 12 so as to correspond to the stop positions (switch positions) of the objective lenses 5. When the objective lenses 5 are switched from one to the other, the ball 16 that has been fitted in the groove 15b is released from the groove 15b, and then the ball 16 coming next is put in and fitted in the groove 15b.

As shown in FIG. 3, a driving gear 20 engaged with the driven gear 13 is mounted behind the revolving-nosepiece rotating unit 12. The driving gear 20 is configured to rotate the revolving-nosepiece rotating unit 12 and is attached to and rotatable around a rotation axis 21 arranged on the revolving-nosepiece body 11. A pitch diameter of the driving gear 20 is set to four-fifths of a pitch diameter of the driven gear 13, so that when the driving gear 20 is rotated one-quarter of a turn, the driven gear 13 is rotated one-fifth of a turn. Therefore, when the driving gear 20 is rotated one-quarter of a turn clockwise or counterclockwise in FIG. 3, the objective lenses 5 can be switched from one to the other.

As shown in FIG. 4, a cam 22 and a revolving-nosepiece switching lever 23 that rotate the driving gear 20 clockwise in FIG. 3 are mounted above the driving gear 20, and the cam 22 and the revolving-nosepiece switching lever 23 that rotate the driving gear 20 counterclockwise in FIG. 3 are mounted below the driving gear 20. The cam 22 that rotates the driving gear 20 clockwise and the cam 22 that rotates the driving gear 20 counterclockwise are mounted upside down to each other across the driving gear 20, and, as shown in FIG. 3, have the same shape. Similarly, the revolving-nosepiece switching lever 23 that rotates the driving gear 20 clockwise and the revolving-nosepiece switching lever 23 that rotates the driving gear 20 counterclockwise are mounted upside down to each other across the driving gear 20, and have the same shape.

Therefore, only the cam 22 and the revolving-nosepiece switching lever 23 mounted above the driving gear 20 are described in detail below with reference to FIGS. 4 and 6.

Figure 6:
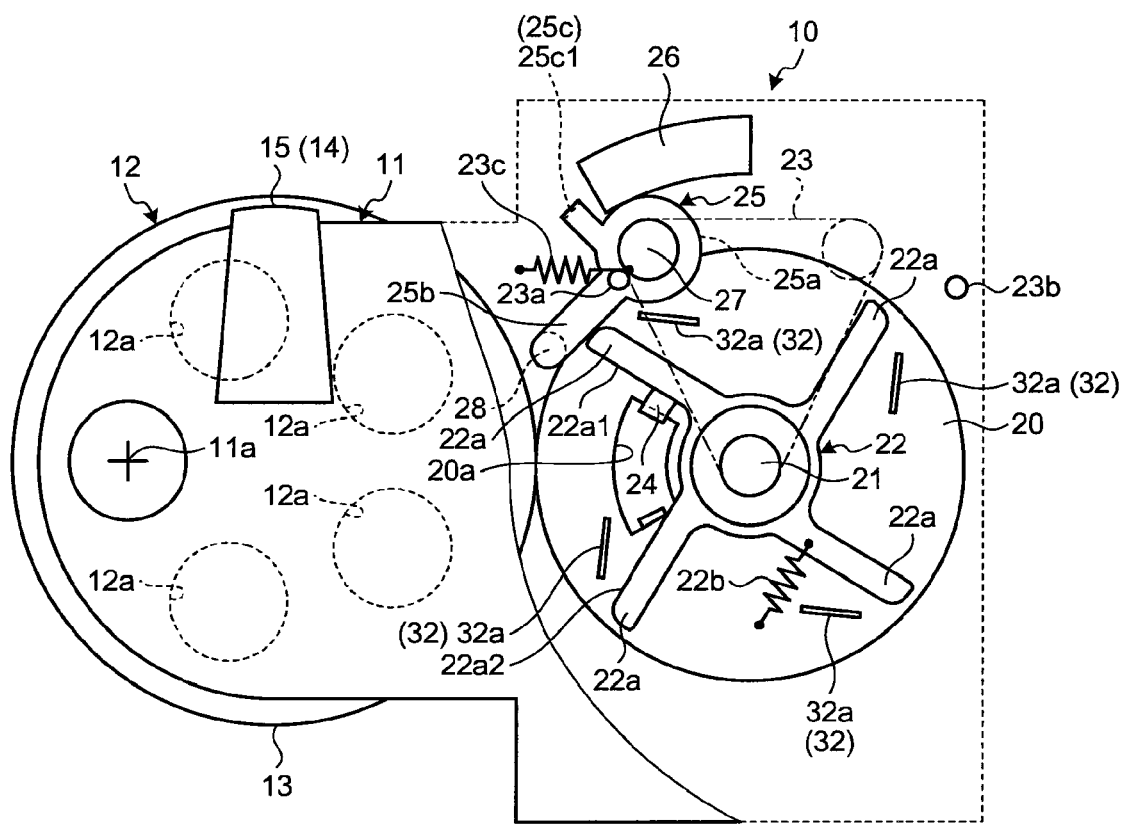
FIG. 6 is a plan view of the revolving nosepiece of the microscope according to the first embodiment, which includes a cam and a revolving-nosepiece switching lever mounted above a driving gear.

FIG. 6 is a plan view of the revolving nosepiece 10 of the microscope according to the first embodiment, which includes the cam 22 and the revolving-nosepiece switching lever 23 mounted above the driving gear 20. For convenience of explanation, the revolving-nosepiece switching lever 23 is illustrated by a chain double-dashed line in FIG. 6.

As shown in FIG. 4, the cam 22 is mounted just above the driving gear 20, and the revolving-nosepiece switching lever 23 is mounted above the cam 22. The cam 22 and the revolving-nosepiece switching lever 23 are attached to and rotatable around the rotation axis 21 that is the center of rotation of the driving gear 20.

As shown in FIG. 6, the cam 22 is configured to rotate the driving gear 20, and includes four arms 22a equally dividing 360 degrees (i.e., adjacent ones of the arms 22a have a phase difference of 90 degrees). Each of the arms 22a is extended in a radial direction from the center of rotation of the cam 22. One side surface of each of the arms 22a functions as a pressing surface (cam surface) 22a1 and the other side surface functions as a retracting surface (cam surface) 22a2.

A cam convex portion 24 is arranged on one of the four arms 22a. The cam convex portion 24 is configured to connect the cam 22 and the driving gear 20, is inserted in a fan-shaped long groove 20a formed on the driving gear 20, and is biased in a rotation direction (clockwise in FIG. 6) by a spring 22b tensioned between the cam 22 (the arm 22a) and the driving gear 20. Therefore, when the cam 22 is rotated clockwise in FIG. 6, the cam 22 and the driving gear 20 rotate in an integrated manner. On the other hand, when the cam 22 is rotated counterclockwise against the biasing force of the spring 22b, the cam convex portion 24 idles in the long groove 20a, so that only the cam 22 rotates.

The revolving-nosepiece switching lever 23 has a substantially isosceles triangle shape, and a vertex portion thereof is attached to and rotatable around the rotation axis 21 that is the center of rotation of the driving gear 20. The rotation of the revolving-nosepiece switching lever 23 is regulated by a stopper 23a arranged on the left of the revolving-nosepiece switching lever 23 and a stopper 23b arranged on the right of the revolving-nosepiece switching lever 23. A link 25 is rotatably mounted on one corner area of a base side of the revolving-nosepiece switching lever 23 via a rotation axis 27. A spring 23c is tensioned between the revolving-nosepiece body 11 and the revolving-nosepiece switching lever 23 such that the revolving-nosepiece switching lever 23 is biased to rotate counterclockwise in FIG. 3. The link 25 includes a gear portion 25a, a link portion 25b, and a link convex portion 25c. The gear portion 25a is engaged with an internal gear 26 fixed to the revolving-nosepiece body 11 such that the link 25 rotates counterclockwise by rotating the revolving-nosepiece switching lever 23 clockwise in FIG. 6. In other words, when the revolving-nosepiece switching lever 23 is rotated clockwise, the link 25 revolves around the rotation axis 21 that is the center of rotation of the driving gear 20 while rotating around the rotation axis 27 that is the center of rotation of the link 25. A ratio between pitch diameters of the internal gear 26 and the gear portion 25a is set to 6 to 1. A rotation angle of the link 25 is five times larger than a rotation angle of the revolving-nosepiece switching lever 23 taking deduction of amount of revolution into consideration.

The link portion 25b is extended in a radial direction from the center of rotation of the link 25. A link pin 28 is mounted on an under surface of a distal end of the link portion 25b. The link pin 28 is configured to press the pressing surface 22a1 to rotate the cam 22 while moving along the pressing surface 22a1. When the revolving-nosepiece switching lever 23 is rotated clockwise in FIG. 6, the link 25 is rotated counterclockwise, so that the link pin 28 presses the pressing surface 22a1 while moving along the pressing surface 22a1.

A stopper mechanism is arranged between the link 25 and the driving gear 20. The stopper mechanism is configured to prevent shift of a stop position of the revolving-nosepiece rotating unit 12 caused by inertia, and includes the link convex portion 25c formed on the link 25 and a gear stopper 32 mounted on the top surface of the driving gear 20.

The link convex portion 25c is extended in a radial direction from the center of rotation of the link 25, and includes a stopper section 25c1 formed on an under surface of an end of the link convex portion 25c by bending and extended downward.

The gear stopper 32 includes a stopper section 32a extended upward. The stopper section 32a is structured such that it faces to the stopper section 25c1 across a small space when switching operation ends. The stopper section 32a is structured such that even in a situation where the stopper section 25c1 is brought into contact with the gear stopper 32, the stopper section 32a is then brought into face-to-face confronting relation with the stopper section 25c1 across a small space when the ball 16 falls in the groove 15b of the click mechanism 14 and fitted in the center of the groove 15b.

This configuration will be described in detail below with reference to FIGS. 7A to 7E and 8A to 8D. FIGS. 7A to 7E and 8A to 8D are schematic diagrams illustrating a relation between the link 25 and the cam 22.

Figure 7A:
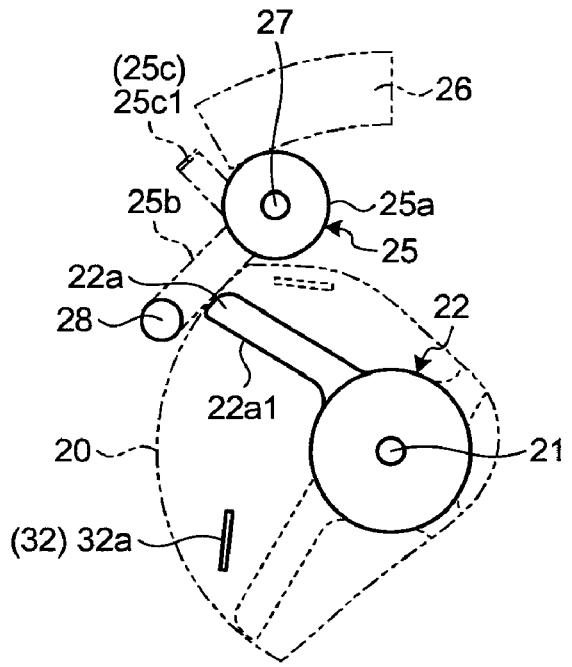
FIG. 7A is a schematic diagram illustrating a relation between a link and a cam in a standby state.

In a standby state before the switching operation of the revolving-nosepiece switching lever 23 is started, as shown in FIG. 6, a left edge of the revolving-nosepiece switching lever 23 is in contact with the stopper 23a. In the standby state, as shown in FIG. 7A, the link pin 28 and the pressing surface 22a1 are distant from each other, so that the link pin 28 does not act on the cam 22. Therefore, the cam 22 can freely rotate in such a manner that even when the revolving-nosepiece rotating unit 12 is rotated (manual operation) and thus the driving gear 20 and the cam 22 are caused to rotate, rotation of the cam 22 is not transmitted to the link pin 28. Thus, in the revolving nosepiece 10 of this embodiment, the objective lenses 5 can be freely switched from one to the other by manually operating the revolving-nosepiece rotating unit 12.

Figure 7B:
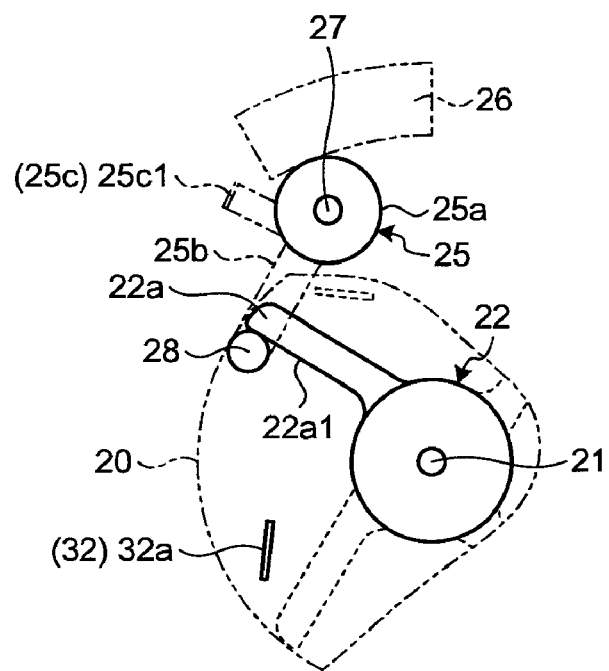
FIG. 7B is a schematic diagram illustrating a relation between the link and the cam when switching operation starts.

As shown in FIG. 7B, when the switching operation is started by slightly rotating the revolving-nosepiece switching lever 23 clockwise, the link 25 is rotated counterclockwise, so that the link pin 28 comes into contact with the pressing surface 22a1. Therefore, an operating force of the revolving-nosepiece switching lever 23 is transmitted to the cam 22, the driving gear 20, and the driven gear 13 (the revolving-nosepiece rotating unit 12) in this order, so that force for releasing the ball 16 from the groove 15b of the click 15 acts in the click mechanism 14. At this time, the link pin 28 presses the pressing surface 22a1 at a position distant from the center of rotation of the cam 22 in a radial direction within a movable range of the link pin 28, and a moving direction of the link pin 28 and a moving direction of the cam 22 cross at substantially right angles, resulting in generating large component of force due to wedge effect. Therefore, magnitude of the operating force can be reduced.

Figure 7C:
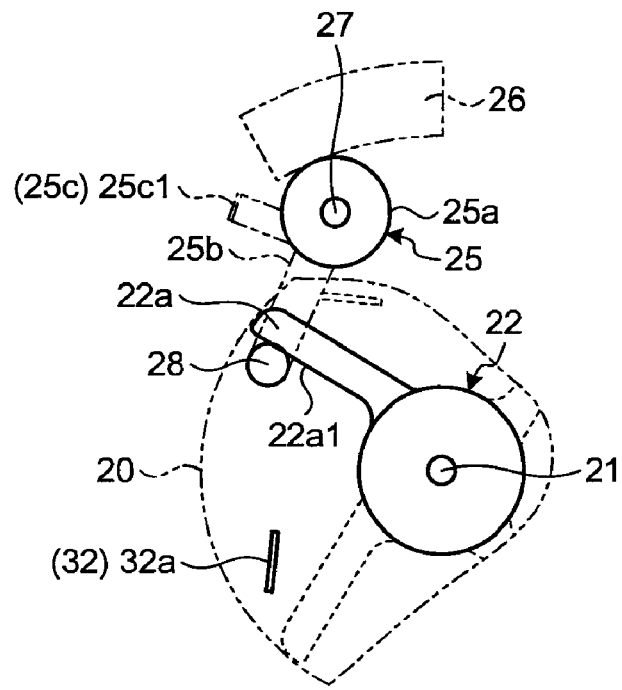
FIG. 7C is a schematic diagram illustrating a relation between the link and the cam just after the switching operation has started.

As shown in FIG. 7C, when the revolving-nosepiece switching lever 23 is further rotated clockwise, force for releasing the ball 16 from the click 15 acts in the click mechanism 14. At this time, as shown in FIG. 7C, the contact point (point of support) between the link pin 28 and the pressing surface 22a1 comes slightly closer to the center of rotation (fulcrum) of the cam 22. However, because the ball 16 is already released from the groove 15b of the click 15, large torque (magnitude of force) is not needed. Therefore, the revolving-nosepiece switching lever 23 can be rotated with relatively small torque (magnitude of force).

Figure 7D:
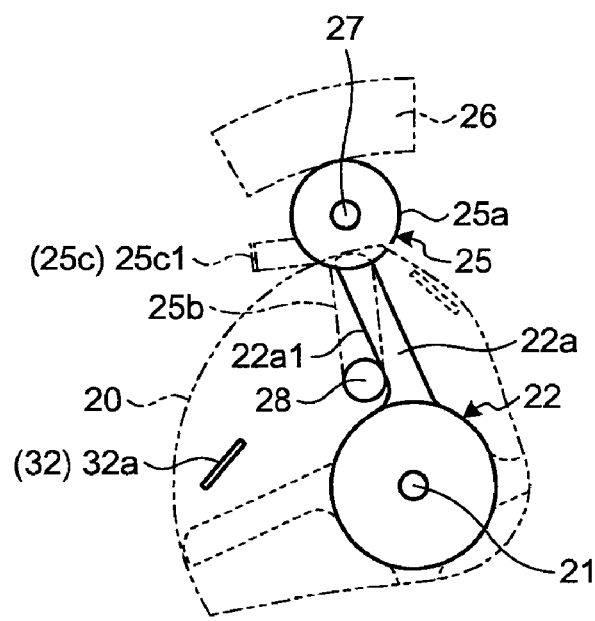
FIG. 7D is a schematic diagram illustrating a relation between the link and the cam during the switching operation.

As shown in FIG. 7D, when the revolving-nosepiece switching lever 23 is further rotated clockwise, the contact point (point of support) between the link pin 28 and the pressing surface 22a1 comes closest to the center of rotation (fulcrum) of the cam 22. Therefore, while the amount of rotation of the cam 22 becomes larger than the amount of operation of the revolving-nosepiece switching lever 23, because the ball 16 is already released from the click 15, the revolving-nosepiece switching lever 23 can be rotated with a small operating force (magnitude of force).

Figure 7E:
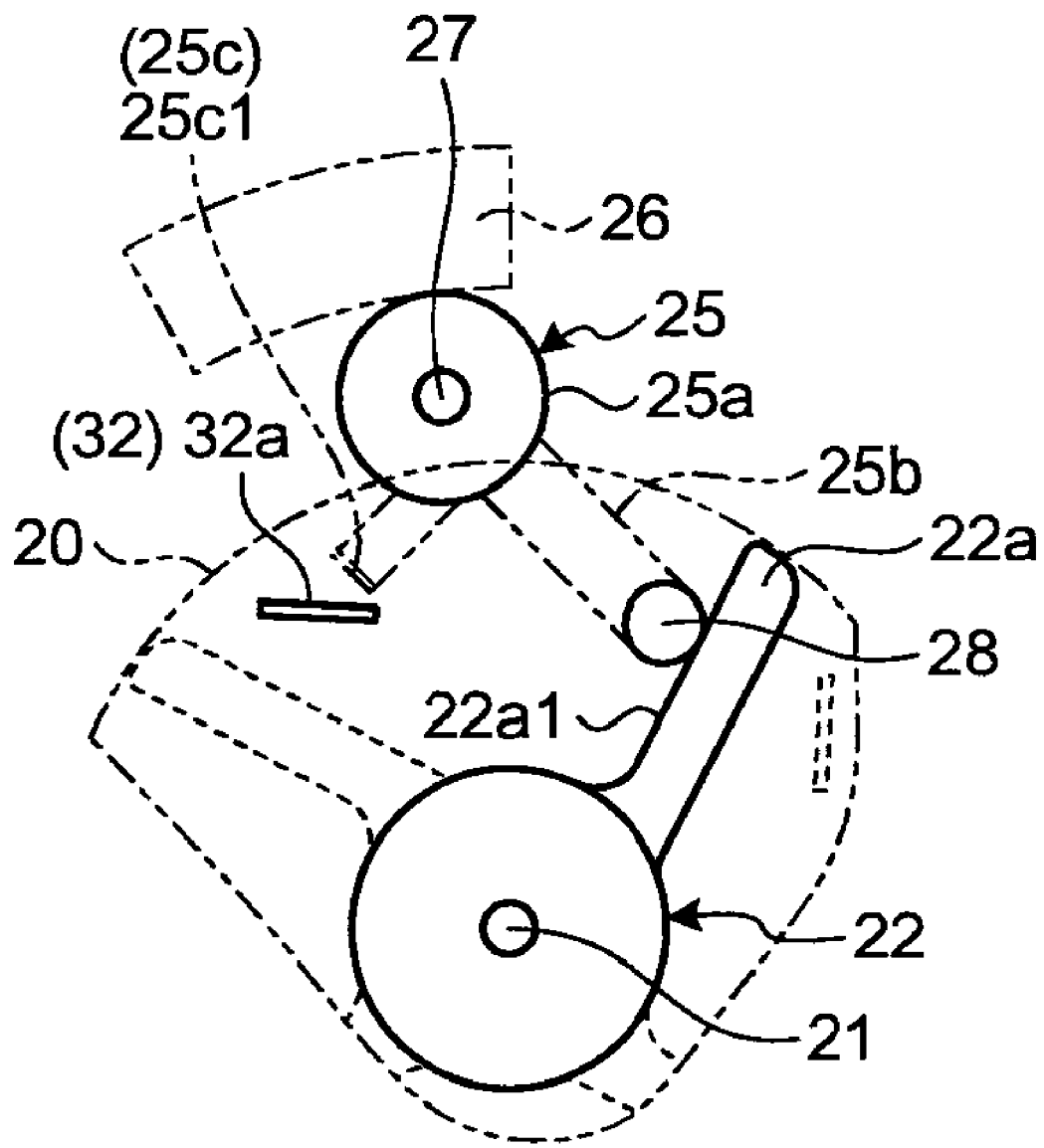
FIG. 7E is a schematic diagram illustrating a relation between the link and the cam when the switching operation ends.

As shown in FIG. 7E, when the revolving-nosepiece switching lever 23 is further rotated clockwise, force for putting the ball 16 in the click 15 acts in the click mechanism 14. At this time, the contact point (point of support) between the link pin 28 and the pressing surface 22a1 is located farthest from the center of rotation (fulcrum) of the cam 22 in a radial direction within the movable range of the link pin 28. Therefore, the revolving-nosepiece switching lever 23 can be rotated with relatively small torque (magnitude of force).

When the revolving-nosepiece switching lever 23 is rotated clockwise until it comes into contact with the stopper 23b, the objective lenses 5 are switched from one to the other and the stopper section 32a and the stopper section 25c1 face to each other across a small space. Meanwhile, when the revolving-nosepiece rotating unit 12 is overly rotated (overrun) because of inertia of the revolving-nosepiece rotating unit 12, the stopper section 32a and the stopper section 25c1 come into contact with each other, resulting in stopping the rotation of the revolving-nosepiece rotating unit 12. At this time, because the ball 16 is located within the groove 15b in the click mechanism 14, elastic restoring force of the click 15 acts on the ball 16 such that the revolving-nosepiece rotating unit 12 is slightly rotated (reverse rotation) to fit the ball 16 in the center of the groove 15b. Accordingly, the ball 16 is fitted in the center of the groove 15b and the revolving-nosepiece rotating unit 12 is stopped at a regular position (switching end position).

Figure 8A:
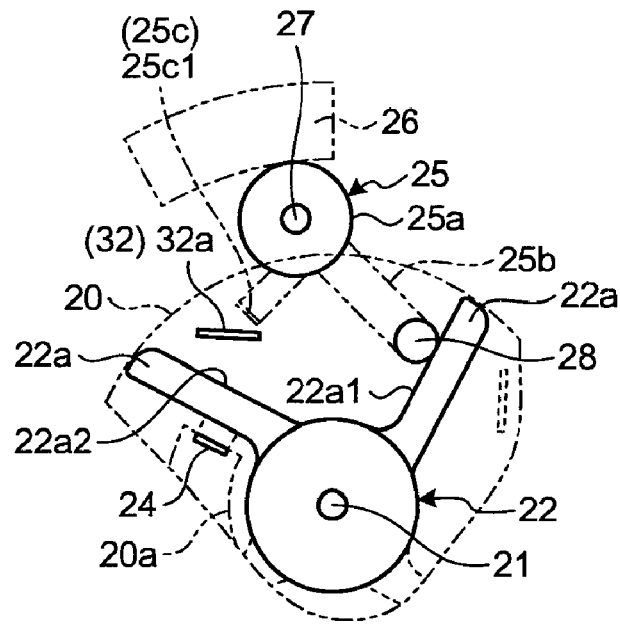
FIG. 8A is a schematic diagram illustrating a relation between the link and the cam when a return operation starts.
Figure 8B:
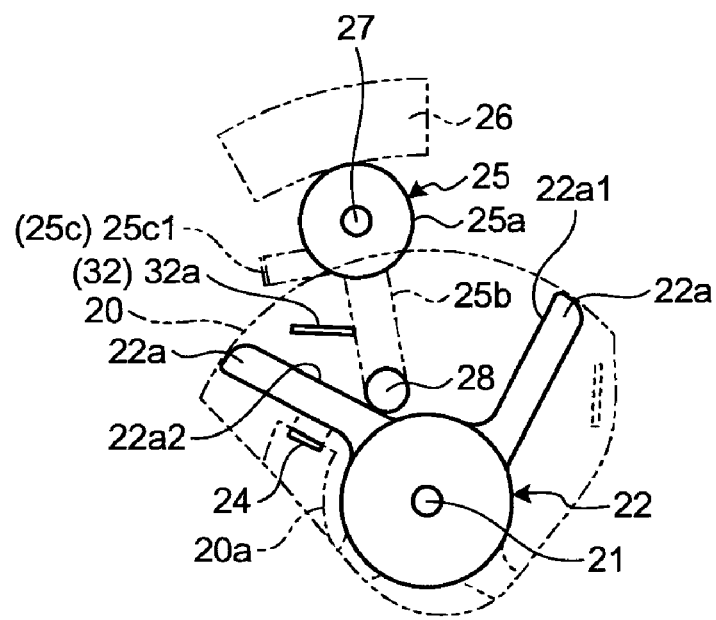
FIG. 8B is a schematic diagram illustrating a relation between the link and the cam during the return operation.

As shown in FIG. 8A, in a state before return operation of the revolving-nosepiece switching lever 23 is started, the stopper section 32a and the stopper section 25c1 face to each other across the small space. When the return operation is started, biasing force of the spring 23c acts to rotate the revolving-nosepiece switching lever 23 counterclockwise. Consequently, as shown in FIG. 8B, the link 25 starts rotating clockwise, so that the link pin 28 comes away from the pressing surface 22a1 and then comes into contact with the retracting surface 22a2.

Figure 8C:
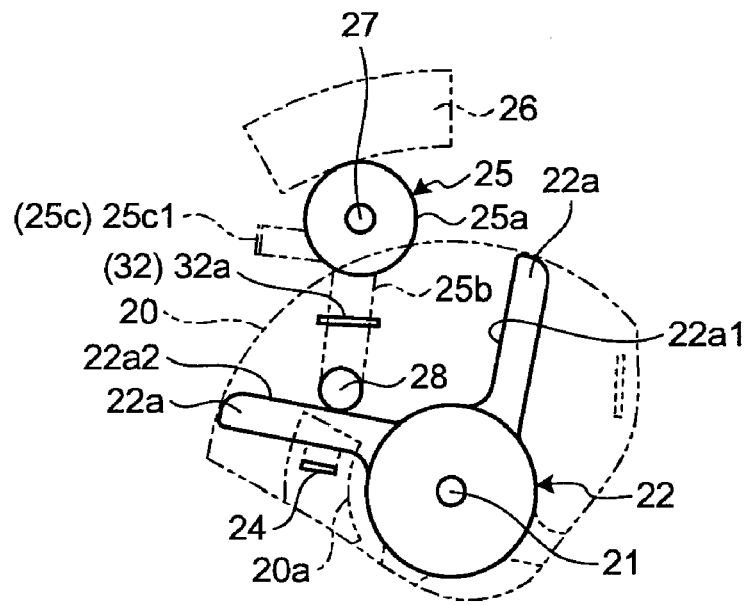
FIG. 8C is a schematic diagram illustrating a relation between the link and the cam just before the return operation ends.

Then, as shown in FIG. 8C, the link pin 28 presses the retracting surface 22a2, so that the cam 22 is rotated counterclockwise and the cam convex portion 24 accordingly idles in the long groove 20a. In other words, the cam convex portion 24 comes away from the right edge of the long groove 20a.

Figure 8D:
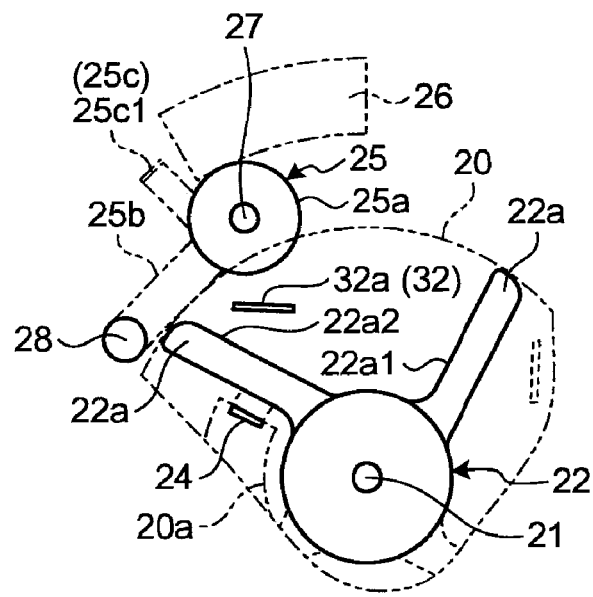
FIG. 8D is a schematic diagram illustrating a relation between the link and the cam after the return operation has ended.

When the revolving-nosepiece switching lever 23 is rotated counterclockwise until it comes into contact with the stopper 23a, as shown in FIG. 8D, the link pin 28 is released from the retracting surface 22a2, so that the link pin 28 does not act on the cam 22. Subsequently, elastic restoring force of the spring 22b acts on the cam 22, so that the cam convex portion 24 comes into contact with the right edge of the long groove 20a (standby state).

In this manner, when the switching operation of the revolving-nosepiece switching lever 23 is performed, the cam 22 rotates one-quarter of a turn.

As shown in FIG. 2, a link 41 is rotatably connected to the other corner area of the base side of the revolving-nosepiece switching lever 23 mounted above the driving gear 20. The revolving-nosepiece switching lever 23 forms a four-bar cross linkage with the link 41 and a link 42 rotatably connected to the link 41 via one end thereof. An end of a rotation axis 43 is fixed to the other end of the link 42, and an end of an operation lever 44 is fixed to the other end of the rotation axis 43. Therefore, the operation lever 44 and the link 42 are allowed to rotate around the rotation axis 43. The operation lever 44 is extended to near the rear of the focusing handle 7L mounted on the left side surface of the microscope main body 1, and an operation knob (first optical-element switching operating unit) 8La is mounted on an end of the operation lever 44.

A link 45 is rotatably connected to one corner area of a base side of the revolving-nosepiece switching lever 23 mounted below the driving gear 20. The revolving-nosepiece switching lever 23 forms a four-bar parallel linkage with the link 45 and a link 46 rotatably connected to the link 45 via one end thereof. An end of a rotation axis 47 is fixed to the other end of the link 46, and an end of an operation lever 48 is fixed to the other end of the rotation axis 47. Therefore, the operation lever 48 and the link 46 are allowed to rotate around the rotation axis 47. The operation lever 48 is extended to near the rear of the focusing handle 7L mounted on the left side surface of the microscope main body 1, and an operation knob (second optical-element switching operating unit) 8Lb is mounted on an end of the operation lever 48.

The operation knob 8La and the operation knob 8Lb are arrayed in the vertical direction and configured to enable operation of the revolving nosepiece 10 without disturbing operational posture for the focusing handle 7L such that they can be manually operated even with a third finger or a fourth finger (little finger). The operation knob 8La and the operation knob 8Lb are operated by pulling either one of them forward by a predetermined amount, for example, by an arbitrarily-set operation amount in a preferable range from 30 millimeters to 70 millimeters. When the operation knob 8La on the front side is pulled, the revolving-nosepiece rotating unit 12 is rotated counterclockwise in FIG. 2, and when the operation knob 8Lb on the rear side is pulled, the revolving-nosepiece rotating unit 12 is rotated clockwise in FIG. 2.

A fan-shaped sector gear 50 is fixed to the rotation axis 43 described above. A sector gear 51 having the same shape as the sector gear 50 is engaged with the sector gear 50 such that the sector gear 51 rotates clockwise by rotating the sector gear 50 counterclockwise. The sector gear 51 is fixed to a rotation axis 52 that is rotatably supported, and an end of an operation lever 53 is fixed to the rotation axis 52, so that the operation lever 53 and the sector gear 51 are allowed to rotate around the rotation axis 52. The operation lever 53 is extended to near the rear of the focusing handle 7R mounted on the right side surface of the microscope main body 1, and an operation knob (the first optical-element switching operating unit) 8Ra is mounted on an end of the operation lever 53. The operation lever 53 is interlocked with the operation lever 44 such that when the operation knob 8Ra is pulled forward, the operation knob 8La moves forward, and, when the operation knob 8La is pulled forward, the operation knob 8Ra moves forward.

A fan-shaped sector gear 54 is fixed to the rotation axis 47 described above. A sector gear 55 having the same shape as the sector gear 54 is engaged with the sector gear 54 such that the sector gear 55 rotates clockwise by rotating the sector gear 54 counterclockwise. The sector gear 55 is fixed to a rotation axis 56 that is rotatably supported, and an end of an operation lever 57 is fixed to the rotation axis 56, so that the operation lever 57 and the sector gear 55 are allowed to rotate around the rotation axis 52. The operation lever 57 is extended to near the rear of the focusing handle 7R mounted on the right side surface of the microscope main body 1, and an operation knob (the second optical-element switching operating unit) 8Rb is mounted on an end of the operation lever 57. The operation lever 57 is interlocked with the operation lever 48 such that when the operation knob 8Rb is pulled forward, the operation knob 8Lb moves forward, and, when the operation knob 8Lb is pulled forward, the operation knob 8Rb moves forward.

The operation knob 8Ra and the operation knob 8Rb are arrayed in the vertical direction and configured to enable operation of the revolving nosepiece 10 without disturbing operational posture for the focusing handle 7R such that they can be manually operated even with a third finger or a fourth finger. The operation knob 8Ra and the operation knob 8Rb are operated by pulling either one of them forward by a predetermined amount, for example, by an arbitrarily-set operation amount in a preferable range from 30 millimeters to 70 millimeters. When the operation knob 8Ra on the front side is pulled, the revolving-nosepiece rotating unit 12 is rotated counterclockwise in FIG. 2, and when the operation knob 8Rb on the rear side is pulled, the revolving-nosepiece rotating unit 12 is rotated clockwise in FIG. 2.

In this manner, the revolving nosepiece 10 of the microscope according to the first embodiment is configured such that the sector gear 50 fixed to the rotation axis 43 is engaged with the sector gear 51 fixed to the rotation axis 52, so that the revolving-nosepiece rotating unit 12 can be rotated counterclockwise in FIG. 2 by operating either one of the operation knob 8La and the operation knob 8Ra. Similarly, the sector gear 54 fixed to the rotation axis 47 is engaged with the sector gear 55 fixed to the rotation axis 56, so that the revolving-nosepiece rotating unit 12 can be rotated clockwise in FIG. 2 by operating either one of the operation knob 8Lb and the operation knob 8Rb. Thus, an operator of the microscope can selectively operate the operation knob on a preferable side.

More specifically, operation can be performed by pulling either one of the operation knob 8La (8Ra) and the operation knob 8Lb (8Rb) forward. An operating force of the operation knob 8La (8Ra) is transmitted to the revolving-nosepiece switching lever 23 via the link 42 and the link 41, and then further transmitted to the cam 22 via the link 25 and the link pin 28. On the other hand, an operating force of the operation knob 8Lb (8Rb) is transmitted to the revolving-nosepiece switching lever 23 via the link 46 and the link 45, and then further transmitted to the cam 22 via the link 25 and the link pin 28.

Just after the operation of the operating knobs 8La (8Ra) and 8Lb (8Rb) has started, the link pin 28 presses the pressing surface 22a1 at a position distant from the center of rotation of the cam 22, and the moving direction of the link pin 28 and the moving direction of the cam 22 cross at substantially right angles, resulting in generating large component of force due to wedge effect. As a result, the ball 16 can be released from the groove 15b of the click 15 with a small operating force (magnitude of force).

Similarly to a case just after the operation knobs 8La and 8Lb has started, just before the operation of the operating knobs 8La (8Ra) and 8Lb (8Rb) ends, the link pin 28 presses the pressing surface 22a1 at a position distant from the center of rotation of the cam 22, and the moving direction of the link pin 28 and the moving direction of the cam 22 cross at substantially right angles, resulting in generating large component of force due to wedge effect. As a result, the ball 16 can be put in the groove 15b of the click 15 with a small operating force (magnitude of force).

In the revolving nosepiece 10 of the microscope according to the first embodiment as described above, the objective lenses 5 can be switched from one to the other by manually operating the revolving-nosepiece rotating unit 12 or manually operating the operation knob 8La (8Ra) or the operation knob 8Lb (8Rb).

Furthermore, when the ball 16 is released from the groove 15b of the click 15 just after the switching operation of the objective lenses 5 has started, the contact point (point of support) between the link pin 28 and the pressing surface 22a1 is located distant from the center of rotation (fulcrum) of the cam 22. Therefore, an operating force (magnitude of force) of the revolving-nosepiece switching lever 23 can be reduced.

Similarly, when the ball 16 is put in the groove 15b of the click 15 just before the switching operation of the objective lenses 5 ends, the contact point (point of support) between the link pin 28 and the pressing surface 22a1 is located distant from the center of rotation (fulcrum) of the cam 22. Therefore, an operating force (magnitude of force) of the revolving-nosepiece switching lever 23 can be reduced.

Second Embodiment

Figure 9:
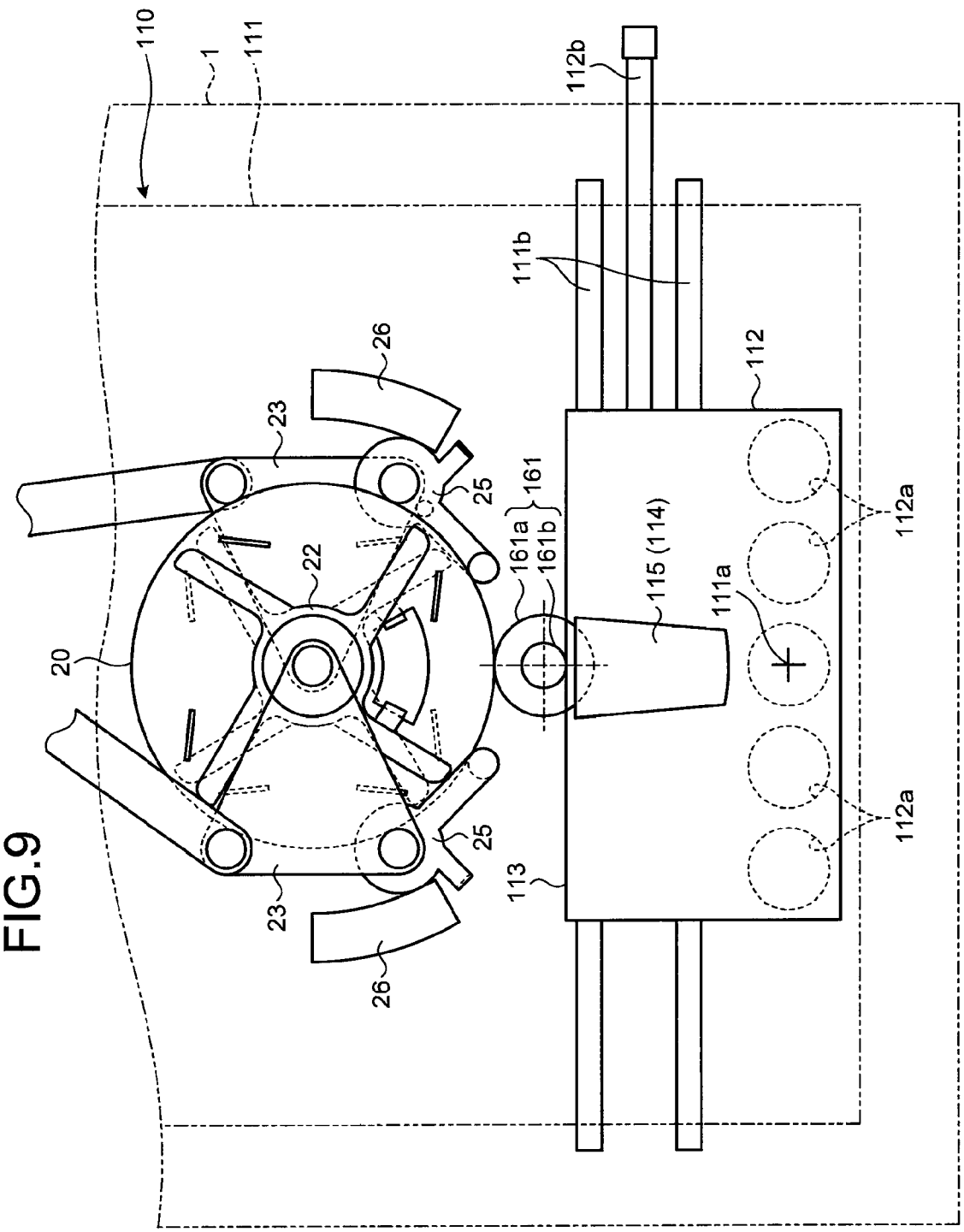
FIG. 9 is a plan view of a revolving nosepiece of a microscope according to a second embodiment of the present invention.

A second embodiment of the present invention will be described below with reference to FIG. 9 using, similarly to the first embodiment described above, an example in which an optical-element switching device of a microscope is applied to a revolving nosepiece of a microscope. FIG. 9 is a plan view of a revolving nosepiece 110 of a microscope according to the second embodiment.

As shown in FIG. 9, the revolving nosepiece 110 of the microscope according to the second embodiment is configured, similarly to the revolving nosepiece 10 described above, to switch objective lenses (optical elements) from one to the other. Specifically, the objective lenses are moved in the horizontal direction when being switched from one to the other (translatory type). The same components as those of the revolving nosepiece 10 of the microscope according to the first embodiment described above are denoted with the same reference symbols, and therefore, the same explanation is not repeated.

The revolving nosepiece 110 includes a revolving-nosepiece body (main body) 111 that is fixed to an underside of the end portion of the arm of the microscope main body 1 and a revolving-nosepiece moving unit (movable member) 112 that is movably mounted on the revolving-nosepiece body 111. A pair of guides 111b is mounted on the revolving-nosepiece body 111. The guides 111b as a pair are bar-shaped members having circular cross sections and mounted parallel to each other. The guides 111b are inserted into guide holes (not shown) formed on the revolving-nosepiece moving unit 112 so that the revolving-nosepiece moving unit 112 can move in the horizontal direction.

An optical path 111a is formed in the revolving-nosepiece body 111 so that a light passing through objective lenses can be guided to the eyepiece via an end portion of the arm of the microscope main body 1 and the lens barrel.

Plural objective lenses can be mounted on the revolving-nosepiece moving unit 112. Specifically, the revolving-nosepiece moving unit 112 in the revolving nosepiece 110 of the microscope according to the second embodiment is configured to have five objective lenses. More specifically, screw holes 112a for mounting the objective lenses are formed on the same line in the moving direction of the revolving-nosepiece moving unit 112 at regular intervals. Therefore, when the revolving-nosepiece moving unit 112 is moved to the left or to the right in FIG. 9, the objective lenses can be switched from one to the other. A rack gear 113 is mounted on a back edge portion of the revolving-nosepiece moving unit 112. An operation lever 112b is mounted on a right side surface of the revolving-nosepiece moving unit 112 such that the revolving-nosepiece moving unit 112 can be moved and thus the objective lenses can be switched from one to the other by direct manual operation of the operation lever 112b.

A click mechanism 114 is arranged between the revolving-nosepiece body 111 and the revolving-nosepiece moving unit 112. The click mechanism 114 is configured to accurately stop the objective lenses at stop positions. The click mechanism 114 of this embodiment includes a click 115 mounted on the revolving-nosepiece body 111 and a ball (not shown) mounted on the revolving-nosepiece moving unit 112. The click 115 is a leaf spring mounted on the revolving-nosepiece body 111 and is structured such that side edges thereof are obliquely bent so that the ball can be put in from both sides and a groove (not shown) in which the ball is to be fitted is arranged in the center of the click 115. The ball is a hemispherical projection formed on a top surface of the revolving-nosepiece moving unit 112 so as to correspond to the stop positions (switch positions) of the objective lenses. When the objective lenses are switched from one to the other, the ball that has been fitted in the groove is released from the groove, and then the ball coming next is put in and fitted in the groove.

The driving gear 20 is mounted behind the revolving-nosepiece moving unit 112. A reduction gear 161 that includes an operation gear portion (large-diameter gear portion) 161a engaged with the driving gear 20 and a driven gear portion (small-diameter gear portion) 161b engaged with the rack gear 113 is mounted between the driving gear 20 and the rack gear 113. A pitch diameter of the operation gear portion 161a is set to be one fourth of a pitch diameter of the driving gear 20. A length of a pitch circle (a developed length) of the driven gear portion 161b is set to be equal to an interval (a pitch) between the screw holes 112a. Therefore, when the driving gear 20 is rotated one-quarter of a turn, the reduction gear 161 is rotated one turn, so that the objective lenses mounted on the adjacent screw holes 112a are switched from one to the other.

The revolving nosepiece 110 of the microscope according to the second embodiment described above is configured to enable switching of the objective lenses from one to the other by operation of an operation knob mounted near a focusing handle. Therefore, an operator of the microscope need not change operation posture for the focusing handle.

Furthermore, the revolving nosepiece 110 of the microscope according to the second embodiment can reduce, similarly to the revolving nosepiece 10 of the microscope according to the first embodiment described above, magnitude of operating force used when the ball is released from the click 115 or when the ball is fitted in the click 115. Moreover, amount of operation of the operation knob can be reduced during the switching operation.

Third Embodiment

Figure 10:
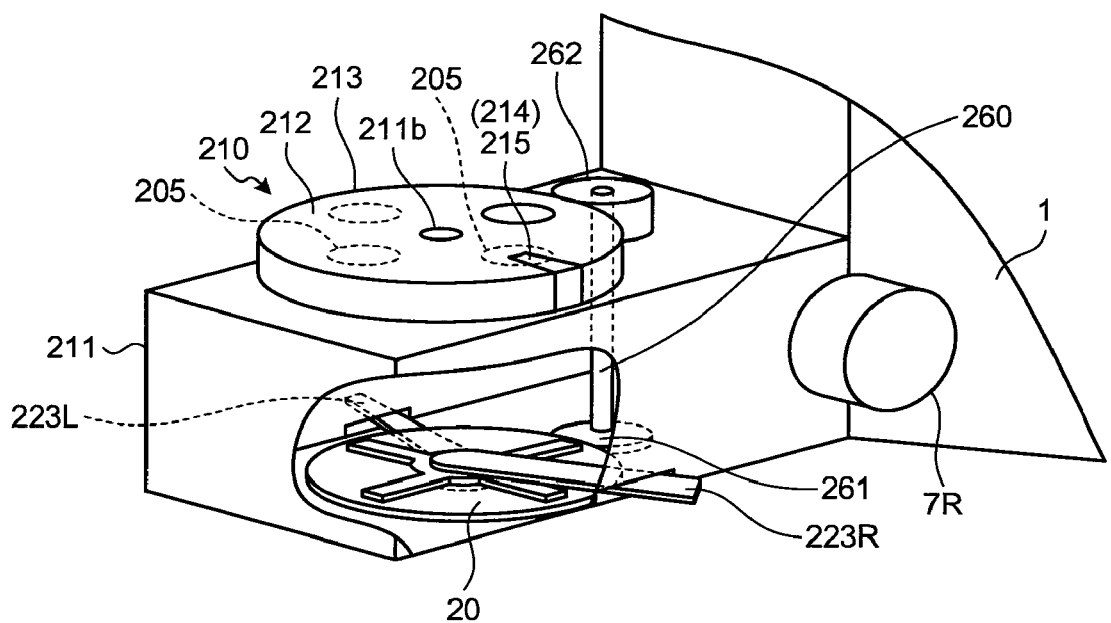
FIG. 10 is a perspective view of a condenser of a microscope according to a third embodiment of the present invention.
Figure 11:
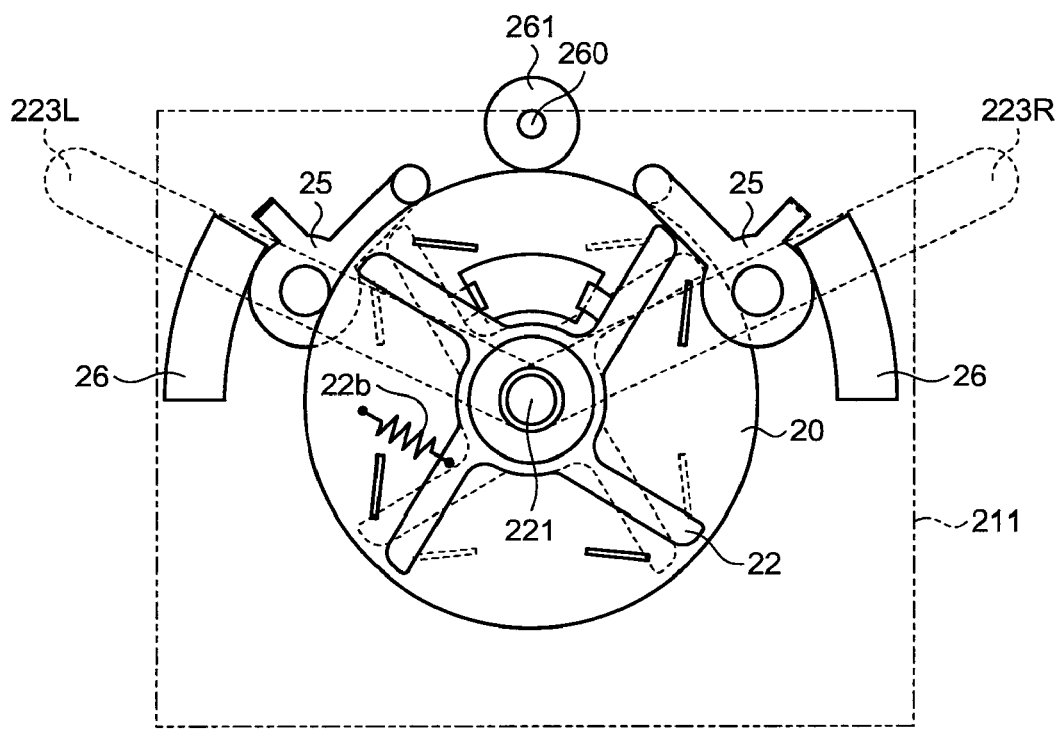
FIG. 11 is a plan view of the condenser shown in FIG. 10.

A third embodiment of the present invention will be described below with reference to FIGS. 10 and 11 using an example in which an optical-element switching device of a microscope is applied to a condenser of a microscope. FIG. 10 is a perspective view of a condenser 210 of a microscope according to the third embodiment. FIG. 11 is a plan view of the condenser 210 shown in FIG. 10. The same components as those of the revolving nosepiece 10 of the microscope according to the first embodiment described above are denoted with the same reference symbols, and therefore, the same explanation is not repeated.

As shown in FIG. 10, the condenser 210 of the microscope according to the third embodiment is configured to enable switching of optical elements 205, and includes a condenser body (casing) 211 that moves up and down along with a stage, and a turret 212 that is rotatably mounted on the condenser body 211.

The turret 212 is rotatably mounted on the condenser body 211 via a rotation axis 211b. Plural optical elements 205 can be mounted on the turret 212. Specifically, the turret 212 of the condenser 210 of this embodiment is configured to have four optical elements 205. More specifically, the optical elements 205 are mounted at positions on the same radius from the center of rotation of the turret 212 at regular intervals. Therefore, when the turret 212 is rotated one-quarter of a turn clockwise or counterclockwise in FIG. 10, the optical elements 205 can be switched from one to the other.

A driven gear 213 is mounted on the circumference of the turret 212. The number of teeth on the driven gear 213 is set to a number divisible by the number of the optical elements 205. In the third embodiment, the number of teeth on the driven gear 213 is set to a number divisible by four.

A click mechanism 214 is arranged between the condenser body 211 and the turret 212. The click mechanism 214 is configured to accurately stop the optical elements 205 at stop positions. The click mechanism 214 of this embodiment includes a click 215 mounted on the condenser body 211 and a ball (not shown) mounted on the turret 212. The click 215 is a leaf spring mounted on a top surface of the condenser body 211 and structured such that side edges thereof are obliquely bent so that the ball can be put in from both sides and a groove in which the ball is to be fitted in is arranged in the center of the click 215. The ball is a hemispherical projection formed on a top surface of the turret 212 so as to correspond to the stop positions (switch positions) of the optical elements 205. When the optical elements 205 are switched from one to the other, the ball that has been fitted in the groove is released from the groove, and then the ball coming next is put in and fitted in the groove.

The driving gear 20 is mounted inside the condenser body (casing) 211. The driving gear 20 is configured to rotate the turret 212 and is attached to and rotatable around a rotation axis 221 arranged on the condenser body 211. An idler 260 is arranged between the driving gear 20 and the driven gear 213 (the turret 212) such that the turret 212 (the driven gear 213) is rotated along with rotation of the driving gear 20. The idler 260 is a rotation axis rotatably supported by the condenser body 211. An idler gear 261 engaged with the driving gear 20 is mounted on one end of the idler 260 and an idler gear 262 engaged with the driven gear 213 (the turret 212) is mounted on the other end of the idler 260. A gear ratio between the driving gear 20 and the idler gear 261 engaged with the driving gear 20 is set to be equal to a gear ratio between the driven gear 213 and the idler gear 262 engaged with the driven gear 213, so that when the driving gear 20 is rotated one turn, the driven gear 213 (the turret 212) is rotated one turn. Therefore, the optical elements 205 can be switched from one to the other by rotating the driving gear 20 one-quarter of a turn clockwise or counterclockwise in FIG. 10.

As shown in FIG. 11, the cam 22 and a switching lever (optical-element switching operating unit) 223R that rotate the driving gear 20 clockwise in FIG. 11 are mounted above the driving gear 20, and the cam 22 and a switching lever (optical-element switching operating unit) 223L that rotate the driving gear 20 counterclockwise in FIG. 11 are mounted below the driving gear 20. The cam 22 that rotates the driving gear 20 clockwise and the cam 22 that rotates the driving gear 20 counterclockwise are mounted upside down to each other across the driving gear 20, and have the same shape. Similarly, the switching lever 223R that rotates the driving gear 20 clockwise and the switching lever 223L that rotates the driving gear 20 counterclockwise are mounted upside down to each other across the driving gear 20, and have the same shape. For convenience of explanation, the switching lever 223R and the switching lever 223L are illustrated by dashed lines in FIG. 11.

As shown in FIG. 10, the switching lever 223R mounted above the driving gear 20 is a plate-like member extended from the center of rotation of the driving gear 20 to near the focusing handle 7R mounted on the right side surface of the microscope main body 1. An end of the switching lever 223R is attached to and rotatable around the rotation axis 221 that is the center of rotation of the driving gear 20.

When, as shown in FIG. 11, the switching lever 223R is rotated clockwise in FIG. 11, an operating force is transmitted to the link 25 and the cam 22 in this order, so that the driving gear 20 is rotated one-quarter of a turn clockwise. When the driving gear 20 rotates one-quarter of a turn clockwise, its rotation is transmitted to the driven gear 213 via the idler 260, so that the turret 212 is rotated one-quarter of a turn clockwise. As a result, the optical elements 205 can be switched from one to the other.

On the other hand, the switching lever 223L mounted below the driving gear 20 is a plate-like member extended from the center of rotation of the driving gear 20 to near the focusing handle 7L mounted on the left side surface of the microscope main body 1. As shown in FIG. 11, an end of the switching lever 223L is attached to and rotatable around the rotation axis 221 that is the center of rotation of the driving gear 20.

When the switching lever 223L is rotated counterclockwise in FIG. 11, an operating force is transmitted to the link 25 and the cam 22 in this order, so that the driving gear 20 is rotated one-quarter of a turn counterclockwise. When the driving gear 20 rotates one-quarter of a turn counterclockwise, its rotation is transmitted to the driven gear 213 via the idler 260, so that the turret 212 is rotated one-quarter of a turn counterclockwise. As a result, the optical elements 205 can be switched from one to the other.

The condenser 210 of the microscope according to the third embodiment described above is configured to enable switching of the optical elements 205 from current one to adjacent one by operation of the switching lever 223L mounted on the left side surface of the microscope main body and the switching lever 223R mounted on the right side surface of the microscope main body. Therefore, an operator of the microscope need not change operation posture.

Furthermore, the condenser 210 of the microscope according to the third embodiment can reduce, similarly to the revolving nosepiece 10 of the microscope according to the first embodiment described above, magnitude of operating force used when the ball is released from the click or when the ball is fitted in the click. Moreover, amount of operation of the switching lever can be reduced during the switching operation.

Fourth Embodiment

Figure 12:
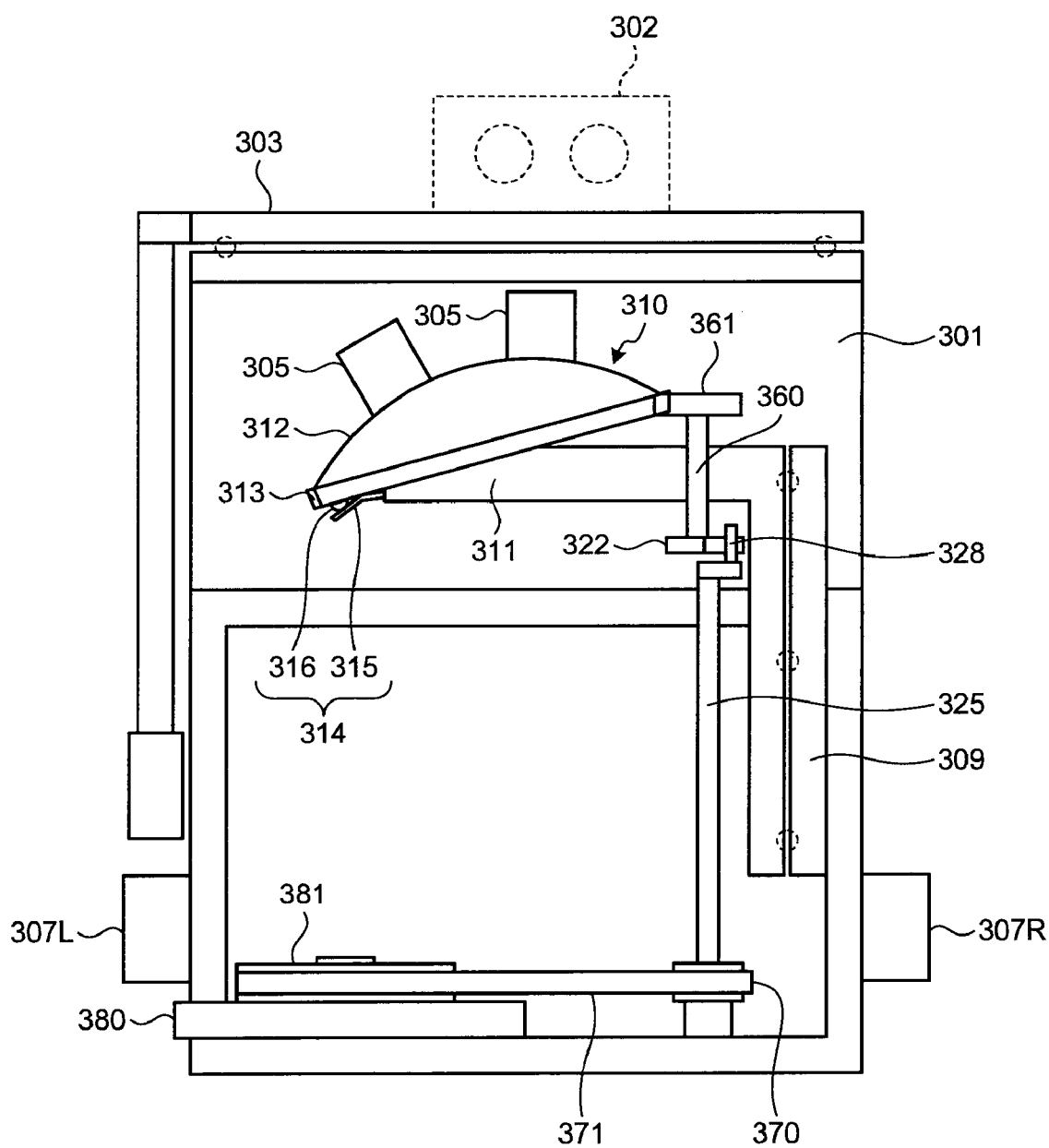
FIG. 12 is a schematic diagram of an inverted microscope according to the third embodiment.

A fourth embodiment of the present invention will be described below with reference to FIG. 12 using an example in which an optical-element switching device of a microscope is applied to a revolving nosepiece of an inverted microscope. FIG. 12 is a schematic diagram of an inverted microscope according to the fourth embodiment.

As shown in FIG. 12, the microscope according to the fourth embodiment includes a microscope main body 301, a lens barrel 302, and a stage 303. The lens barrel 302 is mounted on the microscope main body 301 to enable observation of an image via an eyepiece (not shown). The stage 303 is configured to move in a horizontal direction (X-direction) and in a back-and-forth direction (Y-direction) such that mounted specimen can be moved to a two-dimensional arbitrary position.

A revolving nosepiece 310 of the microscope according to the fourth embodiment is movably guided in the vertical direction by a focusing guide 309. Specifically, the revolving nosepiece 310 moves in the vertical direction (Z-direction) by operating the focusing handles 307R and 307L respectively mounted on the right side surface and the left side surface of the microscope main body 301.

As shown in FIG. 12, the revolving nosepiece 310 of the microscope according to the fourth embodiment is configured to enable switching of objective lenses (optical elements) 305, and includes a revolving-nosepiece body (main body) 311 that is extended in the horizontal direction from a top end of the focusing guide 309 and a revolving-nosepiece rotating unit (movable member) 312 that is rotatably mounted on the revolving-nosepiece body 311.

Plural objective lenses 305 can be mounted on the revolving-nosepiece rotating unit 312. Specifically, the revolving-nosepiece rotating unit 312 of the revolving nosepiece 310 of this embodiment is configured to have four objective lenses 305. More specifically, screw holes (not shown) for mounting the objective lenses 305 are formed at positions on the same radius from the center of rotation of the revolving-nosepiece rotating unit 312 at regular intervals. Therefore, when the revolving-nosepiece rotating unit 312 is rotated one-quarter of a turn clockwise or counterclockwise, the objective lenses 305 can be switched from one to the other.

A driven gear 313 is mounted on the circumference of the revolving-nosepiece rotating unit 312. The number of teeth on the driven gear 313 is set to a number divisible by the number of the objective lenses 305. In the fourth embodiment, the number of teeth on the driven gear 313 is set to a number divisible by four.

A click mechanism 314 is arranged between the revolving-nosepiece body 311 and the revolving-nosepiece rotating unit 312. The click mechanism 314 is configured to accurately stop the objective lenses 305 at stop positions. The click mechanism 314 of this embodiment includes a click 315 mounted on the revolving-nosepiece body 311 and a ball 316 mounted on an underside of the revolving-nosepiece rotating unit 312. The click 315 is a leaf spring mounted on an under surface of the revolving-nosepiece body 311 and structured such that the side edges thereof are obliquely bent so that the ball 316 can be put in from both sides and a groove in which the ball 316 is to be fitted is arranged in the center of the click 315. The ball 316 is a hemispherical projection formed on an under surface of an end of the revolving-nosepiece rotating unit 312 so as to correspond to the stop positions (switch positions) of the objective lenses 305. When the objective lenses 305 are switched from one to the other, the ball 316 that has been fitted in the groove is released from the groove, and then the ball 316 coming next is put in and fitted in the groove.

A bevel gear 361 engaged with the driven gear 313 is mounted on the right of the revolving-nosepiece rotating unit 312 such that when the bevel gear 361 is rotated one turn, the driven gear 313 is rotated one-quarter of a turn, so that the objective lenses 305 are switched from a current one to an adjacent one. The bevel gear 361 is mounted on a top end of a drive axis 360 that is rotatably supported by a base end of the revolving-nosepiece body 311. The bevel gear 361 is configured to move in the vertical direction along with the revolving-nosepiece body 311 and the revolving-nosepiece rotating unit 312. A rotation axis of the revolving-nosepiece rotating unit 312 is inclined with respect to the focusing guide 309. The driven gear 313 and the bevel gear 361 are engaged with each other, and an extension direction of the drive axis 360 coincides with the guide direction of the focusing guide 309.

Figure 13:
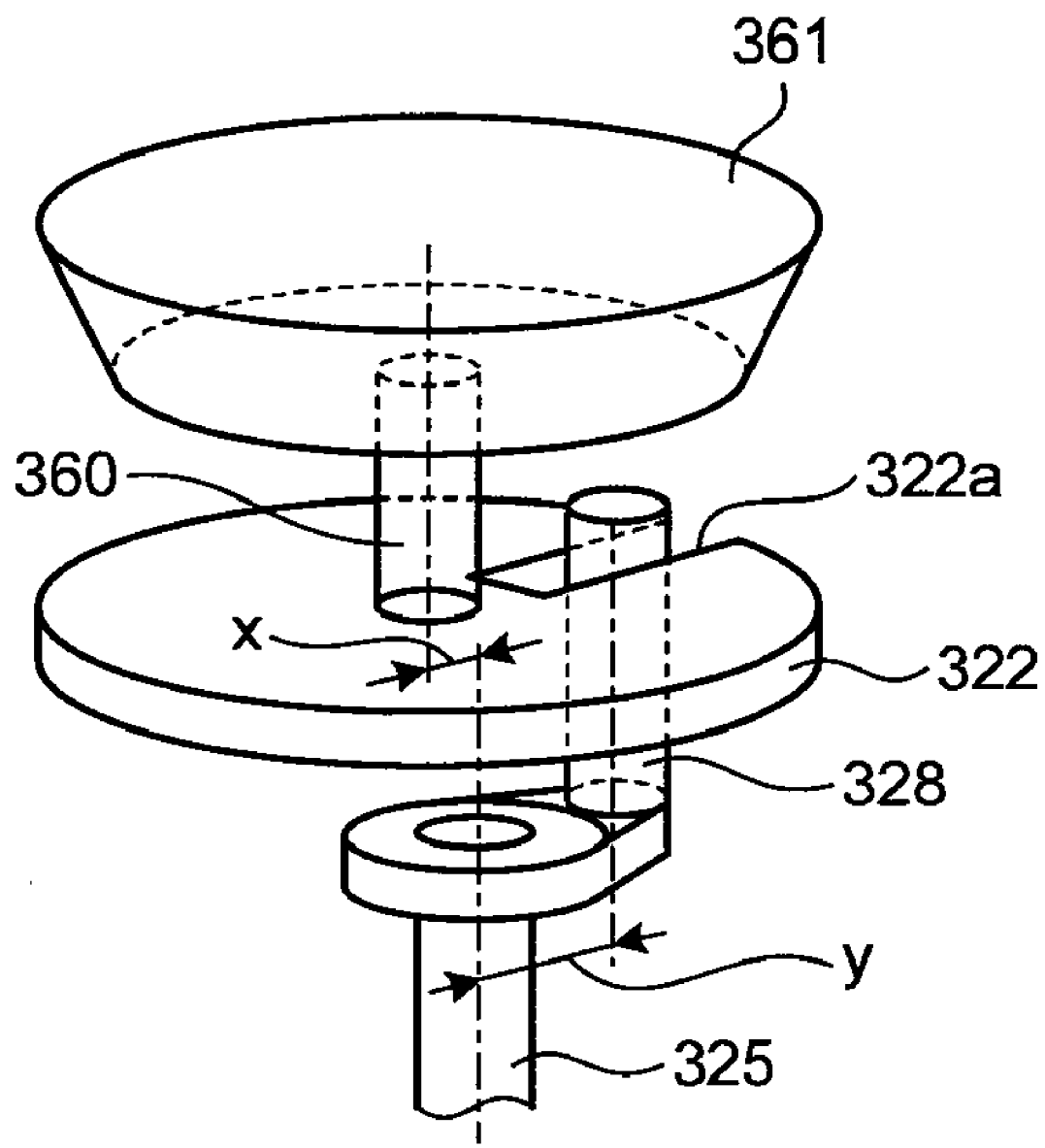
FIG. 13 is a schematic diagram illustrating details of a gearbox shown in FIG. 12.

As shown in FIG. 13, a cam 322 is mounted on a bottom end of the drive axis 360. The cam 322 has a disk shape, and includes a long groove 322a extended in a radial direction from the vicinity of the center of rotation of the cam 322. An actuator pin (link pin) 328 is movably fitted in the long groove 322a. As shown in FIG. 13, the actuator pin 328 is mounted with eccentricity Y on an end of a rotation axis 325 whose center is shifted by X from the center of the drive axis 360. When the rotation axis 325 rotates one turn, the actuator pin 328 rotates around the rotation axis 325.

The above configuration is described will be detail below with reference to FIGS. 14A to 14D. FIGS. 14A to 14D are schematic diagrams illustrating a relation between the actuator pin 328 and the cam 322.

Figure 14A:
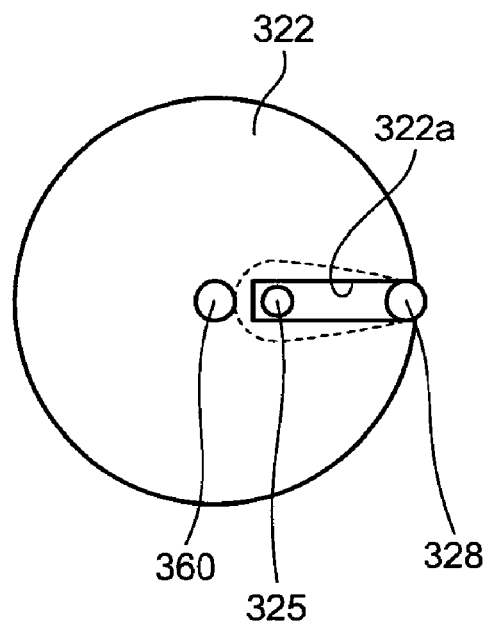
FIG. 14A is a schematic diagram illustrating a relation between a cam and an actuator pin in a standby state.

As shown in FIG. 14A, in a standby state before operation of rotating a rotation axis is started, the actuator pin 328 is located farthest from the drive axis 360. When the switching operation is started, an operating force is transmitted to the rotation axis 325, the actuator pin 328, the cam 322, the drive axis 360, the bevel gear 361, and the driven gear 313 (the revolving-nosepiece rotating unit 312) in this order, so that force for releasing the ball 316 from the groove of the click 315 in the click mechanism 314 is exerted. At this time, the actuator pin 328 presses the cam 322 at a position farthest from the drive axis 360, so that the drive axis 360 can be rotated with a relatively small operating force.

Figure 14B:
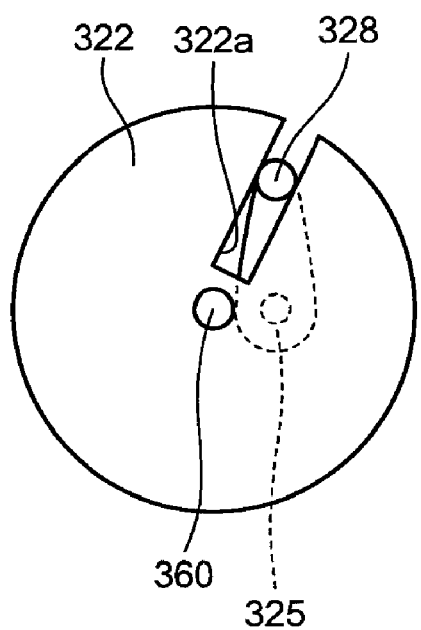
FIG. 14B is a schematic diagram illustrating a relation between the cam and the actuator pin when a rotation axis is rotated one-quarter of a turn.

As shown in FIG. 14B, when the rotation axis 325 is rotated one-quarter of a turn clockwise, the actuator pin 328 gradually comes closer to the drive axis 360. However, because the ball 316 has been released from the click 315, the drive axis 360 can be rotated with a small operating force.

Figure 14C:
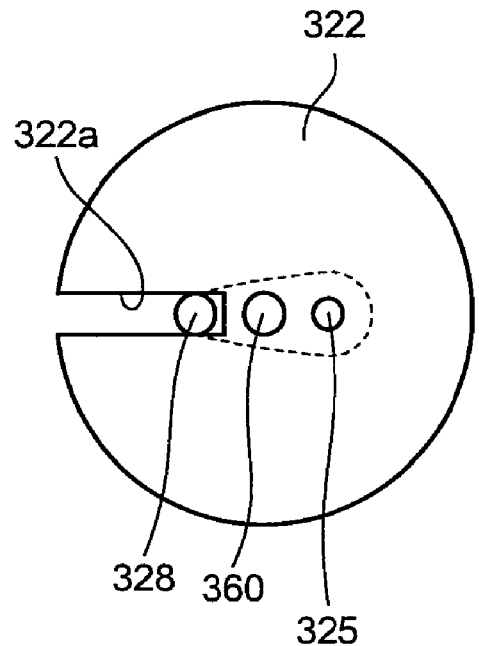
FIG. 14C is a schematic diagram illustrating a relation between the cam and the actuator pin when the rotation axis is rotated half a turn.

When the rotation axis 325 is further rotated one-quarter of a turn clockwise (half a turn in total), as shown in FIG. 14C, the actuator pin 328 comes closest to the drive axis 360. However, because the ball 316 is already released from the click 315, the drive axis 360 can be largely rotated with a small operating force.

Figure 14D:
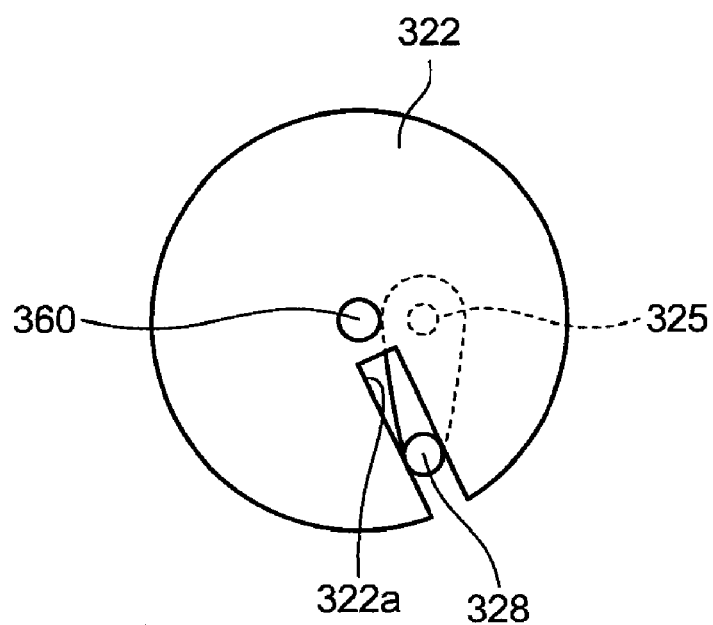
FIG. 14D is a schematic diagram illustrating a relation between the cam and the actuator pin when the rotation axis is rotated three-quarters of a turn.

When the rotation axis 325 is further rotated one-quarter of a turn clockwise (three-quarters of a turn in total), a force for putting the ball 316 in the click 315 is exerted. At this time, as shown in FIG. 14D, the actuator pin 328 gradually comes away from the drive axis 360. Therefore, the drive axis 360 can be largely rotated with a relatively small operating force.

As shown in FIG. 12, a driven pulley 370 is mounted on a bottom end of the rotation axis 325. An operation dial (optical-element switching operating unit) 380 is rotatably mounted inside the microscope main body 301 (a casing)

such that a portion of the operation dial 380 is exposed from the left side surface of the microscope main body 301. A drive pulley 381 is coaxially mounted on the operation dial 380 such that the drive pulley 381 rotates along with rotation of the operation dial 380.

A belt 371 is wound around the drive pulley 381 and the driven pulley 370 described above such that when the drive pulley 381 rotates one-quarter of a turn, the driven pulley 370 rotates one turn. An operating force exerted via the operation dial 380 is transmitted to the driven pulley 370, so that the rotation axis 325 is rotated.

Figure 15:
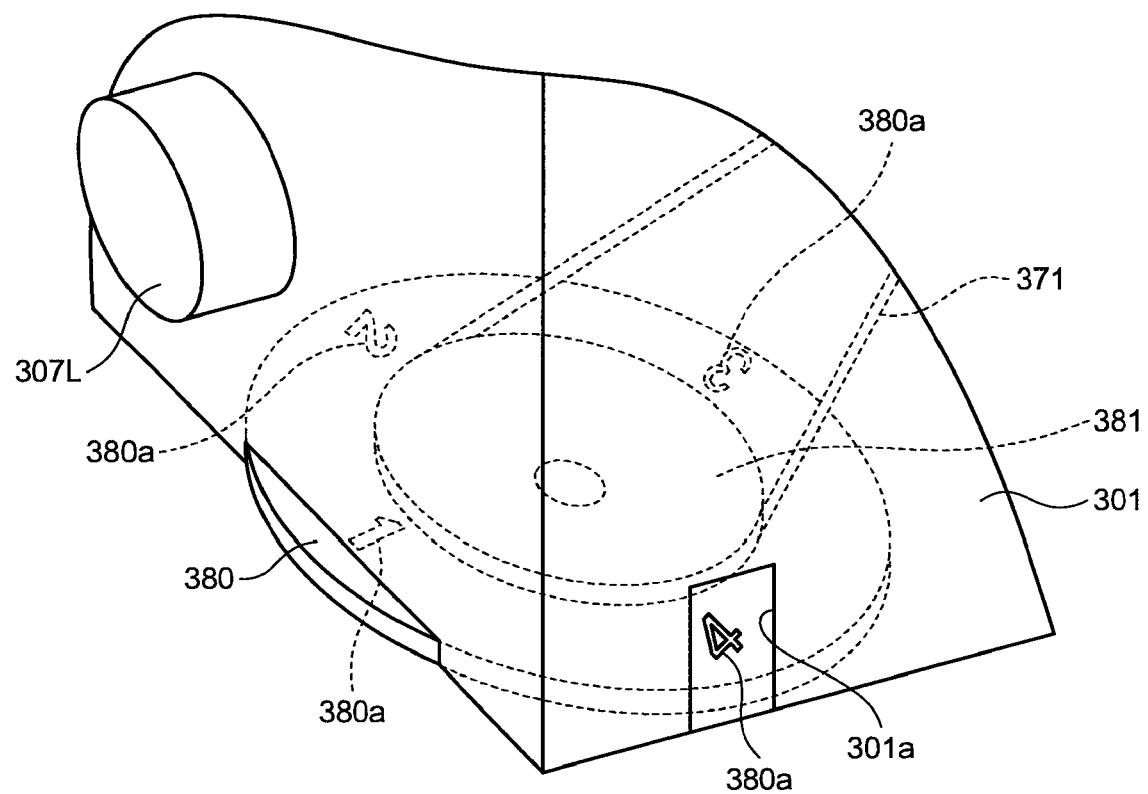
FIG. 15 is a schematic diagram illustrating a front surface of the inverted microscope shown in FIG. 12.

Mounting position numbers 380a for the objective lenses 305 are provided on a top surface of the operation dial 380 in a manner corresponding to the objective lenses 305. The mounting position numbers 380a are, as shown in FIG. 15, provided so that they can be viewed from a small opening 301a formed on the front surface of the microscope main body 301. Therefore, the objective lens 305 being used can be identified by checking the mounting position numbers 380a.

The revolving nosepiece 310 of the microscope according to the fourth embodiment described above is configured to enable switching of the objective lenses 305 from one to the other by rotating the operation dial 380 that is mounted such that a portion thereof is exposed near the focusing handle 307L. Therefore, operation posture for the microscope is not disturbed.

Furthermore, the revolving nosepiece 310 of the microscope according to the fourth embodiment described above can reduce, similarly to the revolving nosepiece 10 of the microscope according to the first embodiment, an operating force used when the ball 316 is released from the click 315 and when the ball 316 is fitted in the click 315.

The optical-element switching device of the microscope (hereinafter, referred to as "microscope optical-element switching device") shown above has features as described in the following notes 1 to 9.

(Note 1)
A microscope optical-element switching device that includes a main body, a movable member movably mounted on the main body and equipped with a plurality of optical elements, and a click mechanism provided between the main body and the movable member and configured to regulate a stop position of the movable member, the optical-element switching device including:
a cam rotatably mounted on the main body via a rotation axis, having a cam surface extended in a substantially radial direction from the rotation axis, and configured to move the movable body when the cam surface is pressed;
a link rotatably mounted at a position distant from the rotation axis of the cam; and
a link pin mounted on a distal end of the link distant from a center of rotation of the link in a radial direction, the link pin configured to press the cam surface while moving along the cam surface in the substantially radial direction, wherein
the link pin presses the cam surface at a position distant from the rotation axis of the cam in the radial direction within a movable range of the link pin just after rotation of the link has started and just before the rotation of the link ends.

The microscope optical-element switching device described above includes the cam rotatably mounted on the main body via the rotation axis and configured to move the movable body when the cam surface extended in the substantially radial direction from the rotation axis is pressed, the link rotatably mounted at the position distant from the rotation axis of the cam, and the link pin mounted on the distal end of the link distant from the center of rotation of the link in the radial direction and configured to press the cam surface while moving along the cam surface in the substantially radial direction. In the microscope optical-element switching device, the link pin presses the cam surface at the position distant from the rotation axis of the cam in the substantially radial direction within the movable range of the link pin just after rotation of the link has started and just before the rotation of the link ends. Therefore, magnitude of operating force to be used just after switching of the optical elements has started and just before switching of the optical elements ends can be reduced. As a result, switching operation of the optical elements can be performed easily.

(Note 2)
The microscope optical-element switching device according to note 1, wherein the movable member moves so that the optical elements can be switched from one to the other when the cam rotates one-quarter of a turn.

(Note 3)
The microscope optical-element switching device according to note 1, wherein the movable member moves so that the optical elements can be switched from one to the other when the cam rotates one turn.

(Note 4)
The microscope optical-element switching device according to any one of notes 1 to 3, further including:
an internal gear fixed to the main body such that a center of the internal gear coincides with the rotation axis of the cam;
a gear portion mounted on a circumference of the link and engaged with the internal gear; and
a switching lever rotatably mounted in a concentric manner with respect to the rotation axis of the cam and on which the link is rotatably mounted, wherein
when the switching lever is rotated, the link moves around the rotation axis of the cam while rotating around a rotation axis of the link.

(Note 5)
The microscope optical-element switching device according to any one of notes 1 to 4, further including a driving gear engaged with a driven gear mounted on the movable member, wherein the cam causes the driving gear to rotate.

(Note 6)
The microscope optical-element switching device according to note 5, wherein
the ling includes a link stopper,
the driving gear includes a gear stopper, and
the link stopper and the gear stopper are brought into contact with each other to prevent overrun of the movable member.

(Note 7)
The microscope optical-element switching device according to note 4, wherein the switching lever is connected to an operation lever mounted near a focusing handle via a four-bar linkage.

(Note 8)
The microscope optical-element switching device according to note 1, wherein the link pin causes the cam to rotate intermittently in a single direction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

Fifth Embodiment

FIGS. 16 to 23 illustrate a microscope 400 according to a fifth embodiment of the present invention. The microscope 400 of this embodiment is an inverted microscope.

(General Configuration of the Microscope)

Figure 16:
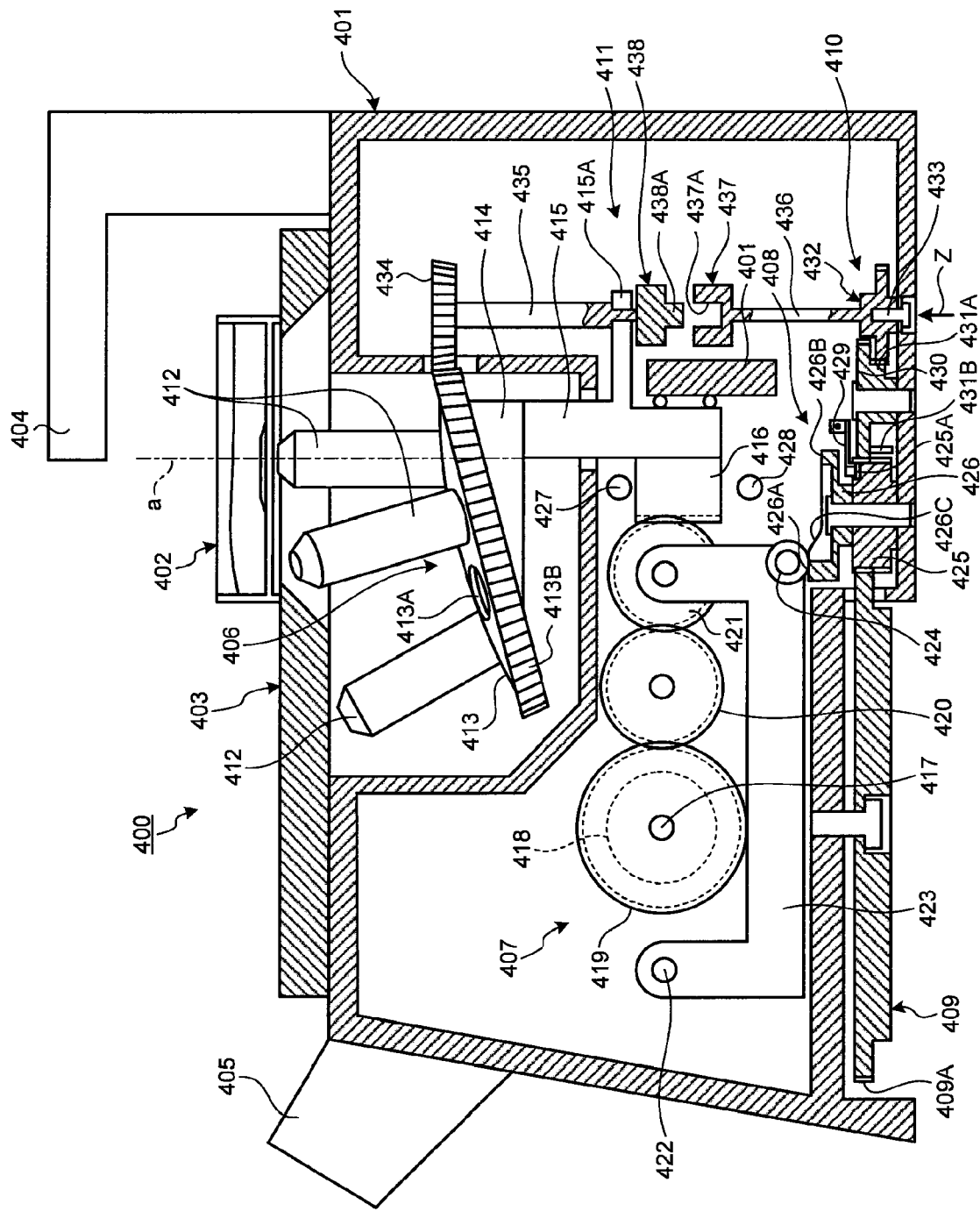
FIGS. 16 to 23 are diagrams illustrating a microscope according to a fifth embodiment of the present invention.

As illustrated in FIG. 16, the microscope 400 includes a microscope main body 401 that functions as a casing and a supporting member, a stage 403 that is arranged on the top of the microscope main body 401 for placing a specimen 402 and is movable in a two-dimensional direction orthogonal to an optical axis a of the microscope by a mechanism not illustrated, a light source 404 for illuminating the specimen 402 on the stage 403, a lens barrel 405 for observing an enlarged image of the specimen 402, an objective-lens switching mechanism 406 that changes a magnification for observing the specimen 402 (observation magnification), a focusing mechanism 407 that slightly moves the objective-lens switching mechanism 406 along the direction of the optical axis a of the microscope for fine adjustment, a cam mechanism 408 as a retraction operation mechanism that largely moves the objective-lens switching mechanism 406 in the direction of the optical axis a of the microscope, a dial 409 as a switching entering unit for entering driving force for switching the objective lenses, a sequential operation mechanism 410 that sequentially causes the objective-lens switching mechanism 406 and the cam mechanism 408 to operate, and a driving-force transmission mechanism 411 that transmits the driving force from the sequential operation mechanism 410 to the objective-lens switching mechanism 406.

(Objective-Lens Switching Mechanism)

Figure 17:
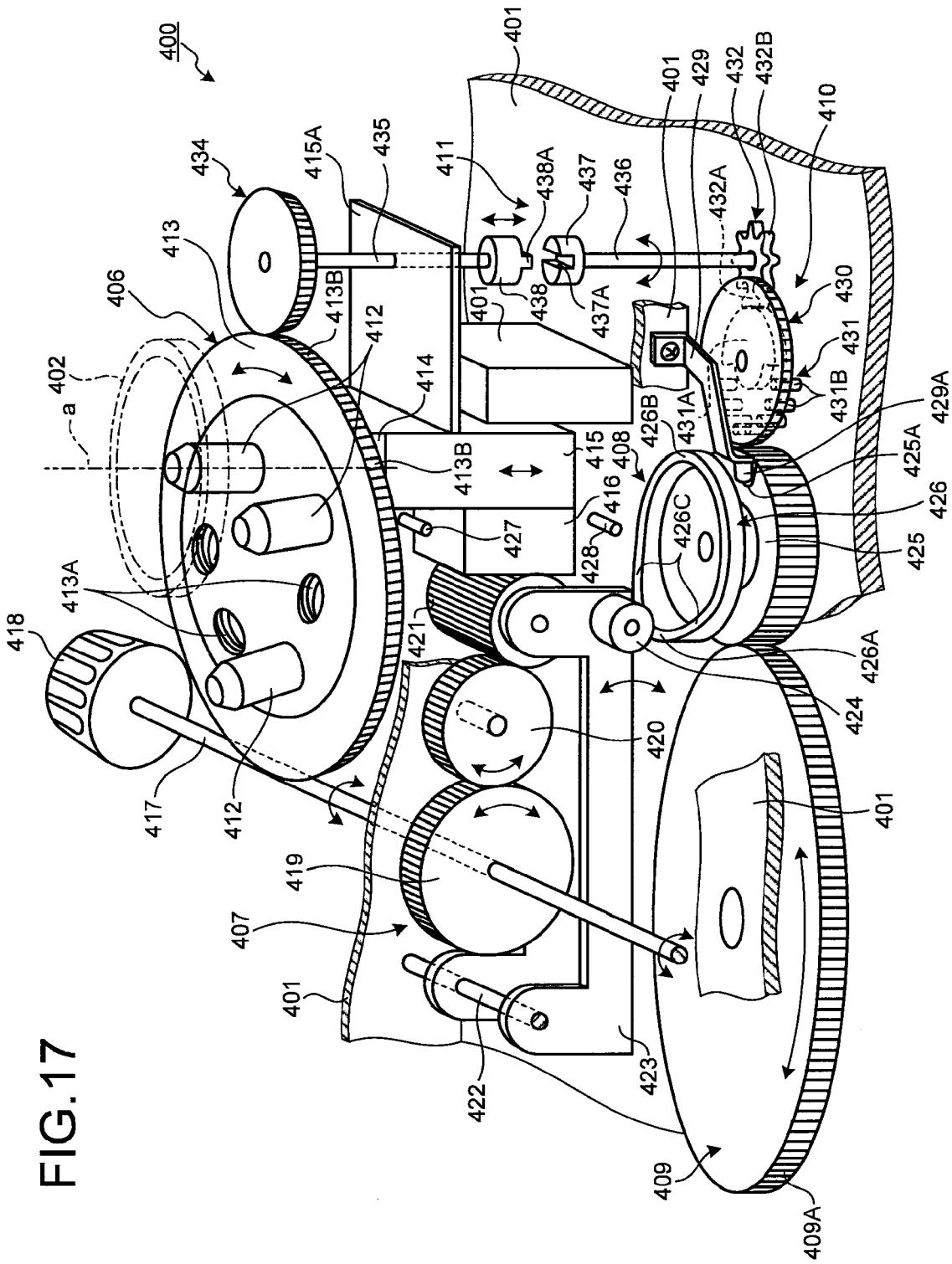

As illustrated in FIGS. 16 and 17, the objective-lens switching mechanism 406 includes a revolving-nosepiece rotating unit 413 on which six objective lenses 412 for example are mountable. Six lens mounting holes 413A are formed on the surface of the revolving-nosepiece rotating unit 413 at regular intervals in a circumferential direction so as to surround a rotation axis of the revolving-nosepiece rotating unit 413. The objective lenses 412 are mounted in the lens mounting holes 413A on an as-needed basis. The revolving-nosepiece rotating unit 413 is rotatably mounted on a revolving-nosepiece body 414 with sliding resistance such that the revolving-nosepiece rotating unit 413 is inclined by 15 degrees with respect to the optical axis a of the microscope. By rotating the revolving-nosepiece rotating unit 413 against the sliding resistance, a click mechanism can position the objective lenses 412 at a position where the optical axis a of the microscope passes.

A bevel portion 413B is formed on the circumferential surface of the revolving-nosepiece rotating unit 413. From the top surface side to the down surface side of the revolving-nosepiece rotating unit 413, the bevel portion 413B is inclined by 15 degrees toward the rotation axis. A main bevel gear 434 for transmitting rotation from the driving-force transmission mechanism 411 to be described later is engaged with the bevel portion 413B of the revolving-nosepiece rotating unit 413 at an axial angle of 15 degrees. In the embodiment, the ratio of the number of teeth of the bevel portion 413B of the revolving-nosepiece rotating unit 413 to the number of teeth of the main bevel gear 434 is set to 6 to 1. That is, by rotating the main bevel gear 434 one turn, the revolving-nosepiece rotating unit 413 rotates by 60 degrees, so that the objective lenses 412 are switched. The angle of the bevel portion 413B is determined based on a speed reduction ratio and an angle between the two axes, and may be other than 15 degrees.

(Focusing Mechanism)

The focusing mechanism 407 includes a focusing lift member 415 that is integrated with the revolving-nosepiece body 414 and moves the objective-lens switching mechanism 406 in the direction of the optical axis a of the microscope, a rack 416 arranged at a lower part on the side surface of the focusing lift member 415 along the direction of the optical axis a of the microscope, a focusing handle 418 that is fixed to a rotation axis 417 rotatably supported on the microscope main body 401 and enters driving force for moving the focusing lift member 415 in the direction of the optical axis a, a spur gear 419 coaxial with the focusing handle 418 and having a relatively large diameter, a spur gear 420 that transmits the rotation of the spur gear 419 and is rotatably supported on the microscope main body 401, a pinion 421 engaged with the spur gear 420 and the rack 416, and a pivot gear box 423 as a pivot frame that rotatably supports the rotatable pinion 421 at one end thereof and is pivotally supported by the microscope main body 401 via a pivot axis 422 at the other end thereof.

(Dial: Switching Entering Unit)

The dial 409 is rotatably supported by the microscope main body 401 in a horizontal posture and below the focusing handle 418. A dial gear 409A is formed on the outer circumferential surface of the dial 409. A cam gear 425 to be described later is engaged with the dial gear 409A. Although the dial 409 is described as a rotary dial, any mechanisms that can transmit the torque to the cam gear 425 are applicable instead of the rotary member. For example, the dial 409 may be a slidable knob or the like.

(Cam Mechanism)

As illustrated in FIGS. 16 and 17, the cam mechanism 408 includes a pivot pin 424 arranged on the pivot gear box 423 including the pinion 421, the cam gear 425 described below, and a cylindrical cam 426. The cam mechanism 408 forms a retraction operation mechanism that performs operation of retracting the objective-lens switching mechanism 406 from the stage 403, maintaining the retracted state, and bringing the objective-lens switching mechanism 406 close to the stage 403 and back to the original position.

As described above, the pinion 421 is rotatably supported by the pivot gear box 423, and the pivot gear box 423 is rotatably supported on the microscope main body 401 by the pivot axis 422. The pivot gear box 423 includes the pivot pin 424 rotatably supported at a position where the pivot pin 424 comes into contact with the cylindrical cam 426 described below. An upper stopper 427 and a lower stopper 428 for regulating upward and downward movement (in the direction of the optical axis a) are provided on the microscope main body 401 at an upper and a lower positions of the rack 416.

As described above, the cam gear 425 of the cam mechanism 408 is engaged with the dial gear 409A of the dial 409. The cam gear 425 is rotatably supported on the microscope main body 401. The ratio of the number of teeth of the cam gear 425 to the number of teeth of the dial gear 409A is 1 to 6. The cylindrical cam 426 of which developed shape is formed of a top flat surface 426A, a bottom flat surface 426B, and two inclined surfaces 426C connecting the two flat surfaces is coaxially fixed to the cam gear 425. The top flat surface 426A and the bottom flat surface 426B are horizontally set so as to be orthogonal to the optical axis a of the microscope. That is, when the pivot pin 424 is positioned on the top flat surface 426A or the bottom flat surface 426B, torque due to the gravity does not act on the pivot gear box 423. The top flat surface 426A and the two inclined surfaces 426C are in a range of 180 degrees when the cylindrical cam 426 is developed at 360 degrees. That is, the bottom flat surface 426B is in a range of 180 degrees, so that when the pivot pin 424 comes into contact with the bottom flat surface 426B, the focusing lift member 415 is moved down and the bottom surface of the rack 416 comes into contact with the lower stopper 428.

As illustrated in FIG. 17, a click groove 425A is formed on the top surface of the cam gear 425 along a radial direction from the center of rotation. The click groove 425A is formed so that a cylindrical head portion 429A arranged on an end portion of a leaf spring 429 fixed to the microscope main body 401 can be shallowly fitted thereto. The leaf spring 429 is biased to bring the cylindrical head portion 429A into contact with the top surface of the cam gear 425 by predetermined pressing force. Therefore, the cylindrical head portion 429A can be engaged with the click groove 425A with click operation and released from the click groove 425A along with the rotation of the cam gear 425. Because only one click groove 425A is formed on the top surface of the cam gear 425, the click groove 425A is engaged with the cylindrical head portion 429A with the click operation every time the cam gear 425 rotates one turn.

The position of the click groove 425A of the cam gear 425 in the rotation direction is set such that when the click groove 425A is positioned at the cylindrical head portion 429A of the leaf spring 429, the pivot pin 424 is positioned on the top flat surface 426A of the cylindrical cam 426. That is, this state is such an observation state that the focusing lift member 415 is lifted up and the objective lenses 412 are brought close to the specimen 402.

(Sequential Operation Mechanism)

Figure 18:
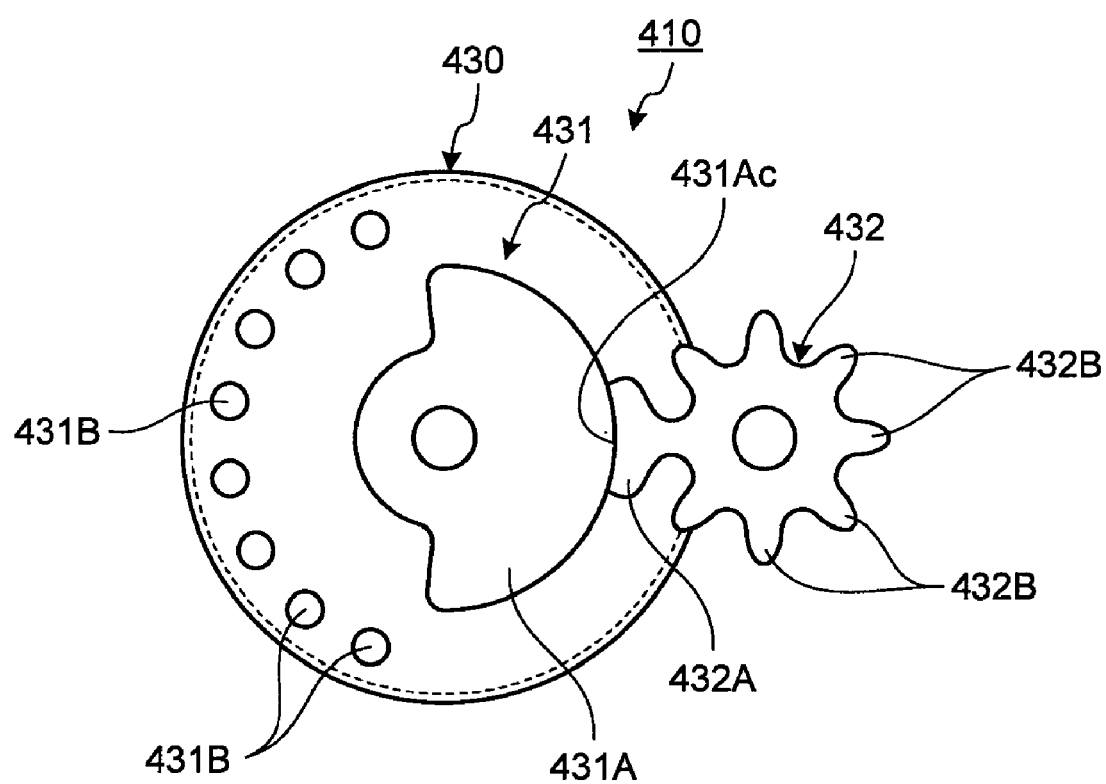

The sequential operation mechanism 410 will be described below with reference to FIGS. 16 to 18. FIG. 18 is a diagram of a master gear 430 and a slave 432 viewed from a direction of an arrow Z in FIG. 16. The sequential operation mechanism 410 includes the master gear 430 as a first gear engaged with the cam gear 425 and to which the rotation of the dial 409 is always transmitted, and the slave 432 as a second gear that operates along with a master 431 arranged on the master gear 430. The ratio of the number of teeth of the master gear 430 to the number of teeth of the cam gear 425 is 1 to 1. The slave 432 is a gear that is selectively engaged with and driven with the master gear 430 in a predetermined angular range (in this embodiment, 180 degrees) around the center of the master gear 430. The master gear 430 is what is called a pin gear, and includes a holding portion 431A in the form of a circular arc in the angular range of 180 degrees around the center of the master gear 430, and eight cylindrical pin portions 431B arranged in the circumferential direction of the master gear 430 in a range of 160 degrees separated by 10 degrees from each edge of the holding portion 431A. The holding portion 431A and the pin portions 431B form the master 431. In the master gear 430, the pin portions 431B are disposed on the outer side in the radial direction (close to the circumference) compared to the holding portion 431A.

The slave 432 includes a held portion 432A that is in the form of an epigastrium and comes into sliding contact with the circumferential surface of the holding portion 431A of the master gear 430, and a slave gear 432B that is in the form of an epicycloid and is engageable with the eight pin portions 431B of the master gear 430. As illustrated in FIG. 16, the slave 432 is rotatably supported on the microscope main body 401 (bottom plate) by a support shaft 433. The positional relationship between a central portion 431Ac of the circumferential surface of the holding portion 431A of the master 431 and the epigastrium-shaped held portion 432A of the slave 432 is set such that when the click groove 425A of the cam gear 425 is positioned so as to be engaged with the leaf spring 429, the central portion 431Ac and the held portion 432A face each other while coming into sliding contact with each other.

(Driving-Force Transmission Mechanism)

As illustrated in FIGS. 16 and 17, the driving-force transmission mechanism 411 includes the main bevel gear 434 engaged with the bevel portion 413B of the revolving-nosepiece rotating unit 413, a revolving-nosepiece shaft 435 as a second driving-force transmission shaft that is the rotation axis of the main bevel gear 434 and extends downward, and a slave shaft 436 as a first driving-force transmission shaft that is coaxial with the center of the rotation of the slave 432 of the sequential operation mechanism 410 and extends upward. The revolving-nosepiece shaft 435 is disposed along a vertical direction and coaxially with the slave shaft 436. The bottom portion of the revolving-nosepiece shaft 435 is rotatably supported by a bearing plate 415A that extends laterally from the focusing lift member 415.

A connecting portion 437 that has a concave slave groove 437A covering the center of rotation is arranged on the top end portion of the slave shaft 436. A connected portion 438 that has a convex revolving-nosepiece protrusion 438A to be engaged with the slave groove 437A is arranged on the bottom end portion of the revolving-nosepiece shaft 435.

(Positional Relationship Between the Focusing Lift Member And the Upper and Lower Stoppers)

A positional relationship between the rack 416 on the focusing lift member 415 side and the upper and the lower stoppers 427 and 428 will be described below.

The amount of movement of the focusing lift member 415 between the upper stopper 427 and the lower stopper 428, which regulate the range of movement of the focusing lift member 415 of the focusing mechanism 407, is set to 10 mm for example, and a difference in height between the top flat surface 426A and the bottom flat surface 426B of the cylindrical cam 426 is set to be slightly larger than the range of movement of the focusing lift member 415, e.g., 10 mm+α mm. When the pivot pin 424 is positioned on the bottom flat surface 426B of the cylindrical cam 426, the revolving-nosepiece protrusion 438A of the connected portion 438 overlaps (is engaged with) the slave groove 437A of the connecting portion 437 by 2 mm for example. When the objective lens 412 is focused on the specimen 402 placed on the stage 403, the focusing lift member 415 is positioned above the lower stopper 428 by 4 mm for example.

(Functions and Operation)

The functions and operation of the microscope 400 of this embodiment are described below with reference to FIGS. 16 to 23. In each of FIGS. 19 to 23, (A) is a plan view of the revolving-nosepiece rotating unit 413 viewed from the top, (B) is a side explanatory view of the main components, and (C) is an explanatory diagram illustrating a relationship between the dial 409, the cam mechanism 408, and the sequential operation mechanism 410. Furthermore, in (A) of each of FIGS. 19 to 23, an intersection of +(cross) represents the optical axis a, and a region indicated by a hatched line represents the objective lens 412. In FIGS. 19 to 23, an example is illustrated in which one objective lens 412 is mounted on the revolving-nosepiece rotating unit 413 for convenience of explanation.

First, an observation state will be described in which the objective lens 412 is positioned on the optical axis a of the microscope as illustrated in FIGS. 16, 17, and (A) of FIG. 19, and the objective lens 412 is approximately focused on the specimen while the focusing lift member 415 is in the upper side of the movement range as illustrated in (B) of FIG. 19. In this observation state, as illustrated in (C) of FIG. 19, the rotation angle of the dial 409 as the switching entering unit is 0 degree.

Figure 19:
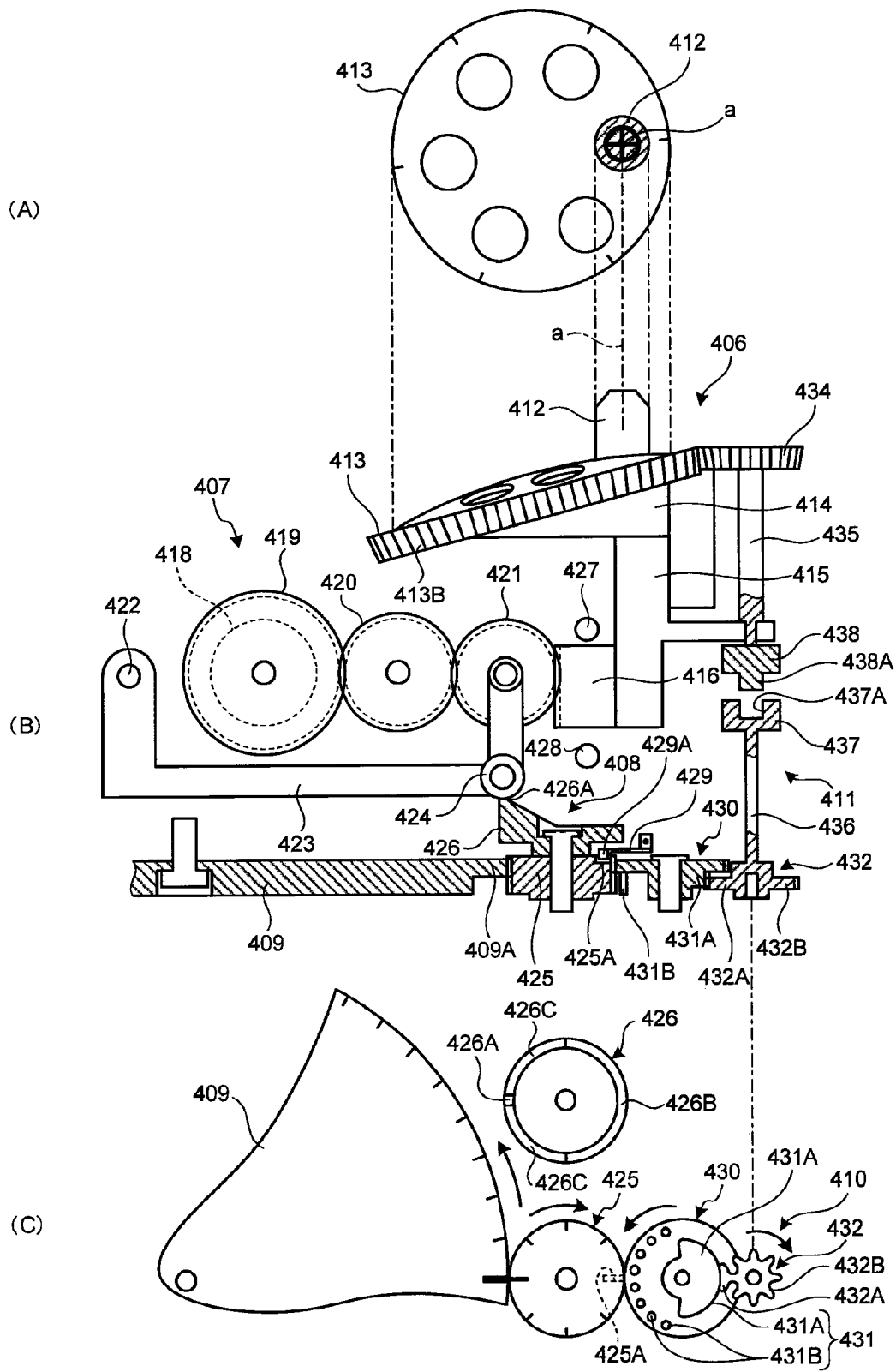
Figure 20:
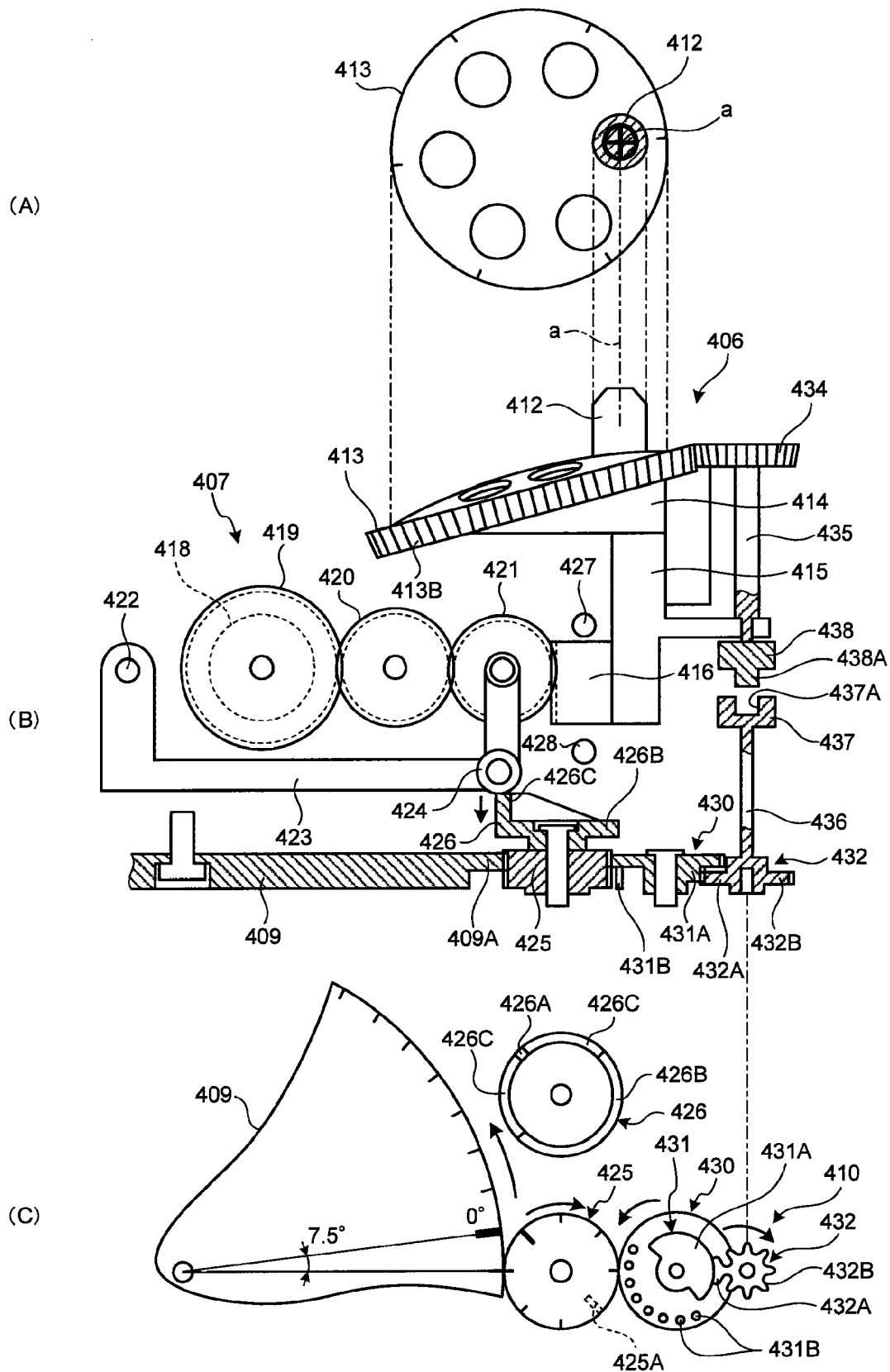

As illustrated in FIGS. 16, 17, and (B) of FIG. 19, in this observation state, the cylindrical head portion 429A at the end portion of the leaf spring 429 falls in the click groove 425A of the cam gear 425 of the cam mechanism 408 and the cam gear 425 is held by the elastic force of the leaf spring 429. Therefore, a state is maintained in which the dial 409 as the switching entering unit and the master gear 430 of the sequential operation mechanism 410, which are engaged with the cam gear 425, are prevented from rotating.

Furthermore, as illustrated in (B) of FIG. 19, the pivot pin 424 of the pivot gear box 423 is positioned on the top flat surface 426A of the cylindrical cam 426, so that the pivot gear box 423 is positioned at the top end of the pivot range. Therefore, the rack 416 engaged with the pinion 421 of the pivot gear box 423 is also positioned at the top end of the movement range. In this observation state, the rack 416 is positioned above the lower stopper 428 by 4 mm for example, so that the slave groove 437A of the connecting portion 437 and the revolving-nosepiece protrusion 438A of the connected portion 438 are not engaged each other. That is, transmission of the driving force is blocked between the sequential operation mechanism 410 and the objective-lens switching mechanism 406.

The downward force due to the gravity of the focusing lift member 415 that supports the objective lens 412 and the revolving-nosepiece rotating unit 413 is transmitted from the rack 416 by two routes. One transmits force for rotating the pinion 421 around the pivot axis 422 of the pivot gear box 423 as the center of rotation, and the other transmits force for rotating the gears, i.e., the pinion 421, the spur gear 420, the focusing handle 418 (the spur gear 419). The rotation due to the former force is regulated when the pivot pin 424 of the pivot gear box 423 is positioned on the top flat surface 426A of the cylindrical cam 426 as illustrated in (B) of FIG. 19. The rotation due to the latter force is regulated by the sufficiently-large sliding resistance applied to the edge of the gear of the focusing handle 418.

Gears need to have clearance called backlash to achieve smooth rotation, and the clearance is generally set to 50 μm to 200 μm. However, in a feed device using the gear, the backlash becomes a dead zone where no output is obtained when a feed direction is reversed. The focal depth of a high-power objective lens used in the microscope is equal to or smaller than 1 μm, which is extremely smaller than the backlash of 50 μm to 200 μm. Therefore, it is indispensable to remove the backlash to feed the focusing unit (the focusing lift member 415) of the microscope with good responsiveness. The gravity applied to the focusing lift member 415 acts as the force for rotating the gears, i.e., the rack 416, the pinion 421, the spur gear 420, and the focusing handle 418 (the spur gear 419), in one direction at any time. Therefore, in this embodiment, the gears can transmit the driving force with good responsiveness without backlash in the transmitting direction.

Next, operation of switching the objective lenses 412 by the dial 409 as the switching entering unit will be described below. The dial 409 starts to rotate by entering force needed for releasing the cylindrical head portion 429A, which is pressed against the click groove 425A of the cam gear 425 engaged with the dial gear 409A, from the click groove 425A. In (C) of FIG. 20, a state is illustrated in which the dial 409 is rotated by 7.5 degrees. Because the state viewed from the bottom is illustrated in (C) of FIG. 20, an arrow indicates a counterclockwise direction of rotation of the dial 409. However, when the dial 409 is actually operated by a user, the dial 409 rotates clockwise. In this embodiment, it is sufficient if the dial 409 is rotated so that the objective lens 412 to be changed comes toward the position of the optical axis a. Therefore, the dial 409 can be rotated either clockwise or counterclockwise. When the dial 409 is rotated as described above, as illustrated in (B) of FIG. 20, the inclined surface 426C of the cylindrical cam 426 is positioned beneath the pivot pin 424, so that the pivot pin 424 moves downward while rolling on the inclined surface 426C due to the downward gravity of the pivot gear box 423. At this time, as illustrated in (A) of FIG. 20, the switching operation is not performed on the objective-lens switching mechanism 406, and the objective lens 412 is aligned along the optical axis a.

When the dial 409 is rotated by 7.5 degrees as described above, the cam gear 425 rotates along with the rotation of the dial 409, and the master gear 430 engaged with the cam gear 425 also rotates along with the rotation of the cam gear 425. Because the ratio of the number of teeth of the cam gear 425 to the number of teeth of the dial gear 409A is 1 to 6, when the dial 409 rotates by 7.5 degrees, the cam gear 425 rotates by 45 degrees as illustrated in (C) of FIG. 20. Furthermore, because the ratio of the number of teeth of the master gear 430 to the number of teeth of the cam gear 425 is 1 to 1, the master gear 430 also rotates by 45 degrees. During this rotation, the held portion 432A of the slave 432 comes into sliding contact with the circumferential surface of the holding portion 431A of the master gear 430, so that the rotation driving force is not transmitted to the slave 432.

Because the lower stopper 428 is positioned above the inclined surfaces 426C of the cylindrical cam 426, the pivot pin 424 of the pivot gear box 423 is slightly moved down. At this time, the rack 416 is only slightly moved down, so that the rack 416 is positioned separated from the lower stopper 428. Therefore, the revolving-nosepiece protrusion 438A of the connected portion 438 arranged at the bottom end of the revolving-nosepiece shaft 435 is not engaged with and connected to the slave groove 437A of the connecting portion 437 arranged at the top end of the slave shaft 436.

The downward movement of the pivot pin 424 causes the pivot movement of the pivot gear box 423 around the pivot axis 422 as the rotation axis. The pivot movement of the pivot gear box 423 causes the pivot movement of the pinion 421. The rack 416 also moves downward along with the pivot movement of the pinion 421 in a downward direction.

Figure 21:
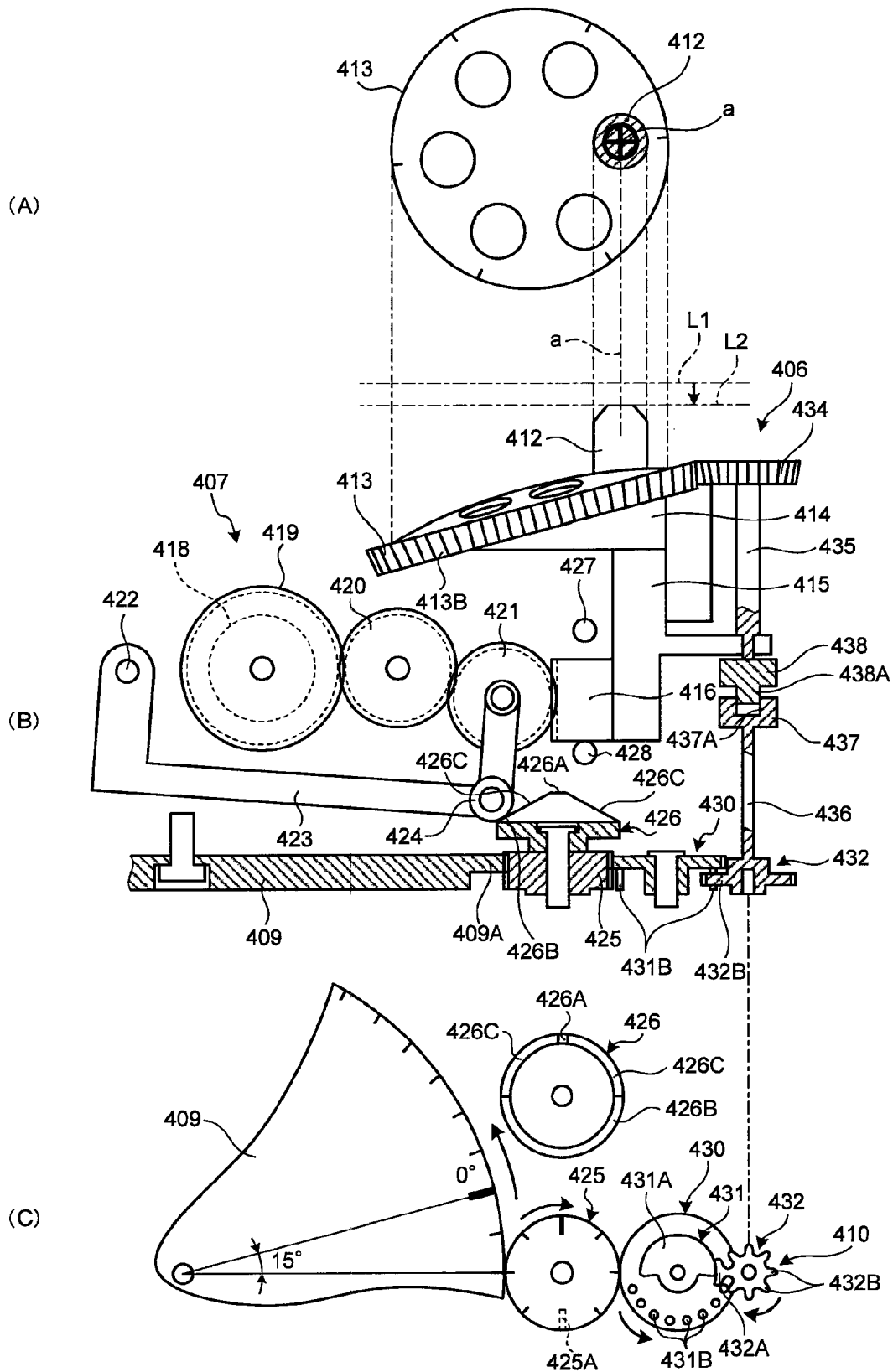

FIG. 21 illustrates a state in which the dial 409 is rotated by 15 degrees. As illustrated in (C) of FIG. 21, the cam gear 425 rotates by 90 degrees by rotating the dial 409 clockwise (counterclockwise in the figure). Therefore, the cylindrical cam 426 integrated with the cam gear 425 also rotates by 90 degrees.

As illustrated in (B) of FIG. 21, the bottom flat surface 426B of the cylindrical cam 426 is positioned beneath the pivot pin 424 by the rotation of 90 degrees. Therefore, the pivot pin 424 is moved downward. Accordingly, the pinion 421 of the pivot gear box 423 is moved downward by using the pivot axis 422 as a fulcrum. Because the rack 416 is engaged with and supported by the pinion 421, the focusing lift member 415 is moved down along with the downward move of the pinion 421. The focusing lift member 415 is moved down until the bottom surface of the rack 416 comes into contact with the lower stopper 428. At this time, as illustrated in (B) of FIG. 21, the objective lens 412 at the position of the optical axis a is moved from a position L1 to a position L2 (retraction position) indicated by chain lines.

In this embodiment, the specimen 402 is in the state where the focus is achieved when the bottom surface of the rack 416 is positioned above the lower stopper 428 by 4 mm. The focusing lift member 415 comes into contact with the lower stopper 428 at a position where the cylindrical cam 426 is rotated by about 36 degrees for example. In the case of a specimen 402 for which a different focal plane is used, because the focusing lift member 415 moves until it comes into contact with the lower stopper 428, the objective lens 412 can be moved to a predetermined position where interference with the stage 403 does not occur regardless of the focal plane for the specimen 402. Because the pivot axis 422 of the pivot gear box 423 is disposed on the side of the focusing handle 418 relative to the spur gear 420, distances between the center of the pinion 421 and the rack 416 and between the centers of the pinion 421 and the spur gear 420 are slightly increased due to the pivot of the pivot gear box 423. Smooth rotation of gears is prevented from being disturbed due to the pivot, which may otherwise be disturbed when the clearance between the gears is shortened. Furthermore, because the pivot angle is about 7 degrees, which is small, the increase in the distance between the centers is about 0.3 mm, so that the gears are not disengaged from each other.

When the focusing lift member 415 is moved down as describe above, the revolving-nosepiece protrusion 438A at the bottom end of the revolving-nosepiece shaft 435 rotatably supported on the focusing lift member 415 side is engaged with and connected to the slave groove 437A of the connecting portion 437 of the slave shaft 436.

In this state, as illustrated in (C) of FIG. 21, the slave gear 432B is not engaged with the pin portions 431B of the master gear 430, so that the rotation driving force is not transmitted to the objective-lens switching mechanism 406. Because the rotation of the slave 432 is regulated until the master 431 is rotated by 90 degrees, the concave of the slave groove 437A and the convex of the revolving-nosepiece protrusion 438A are maintained at the same positions in the rotation direction.

Figure 22:
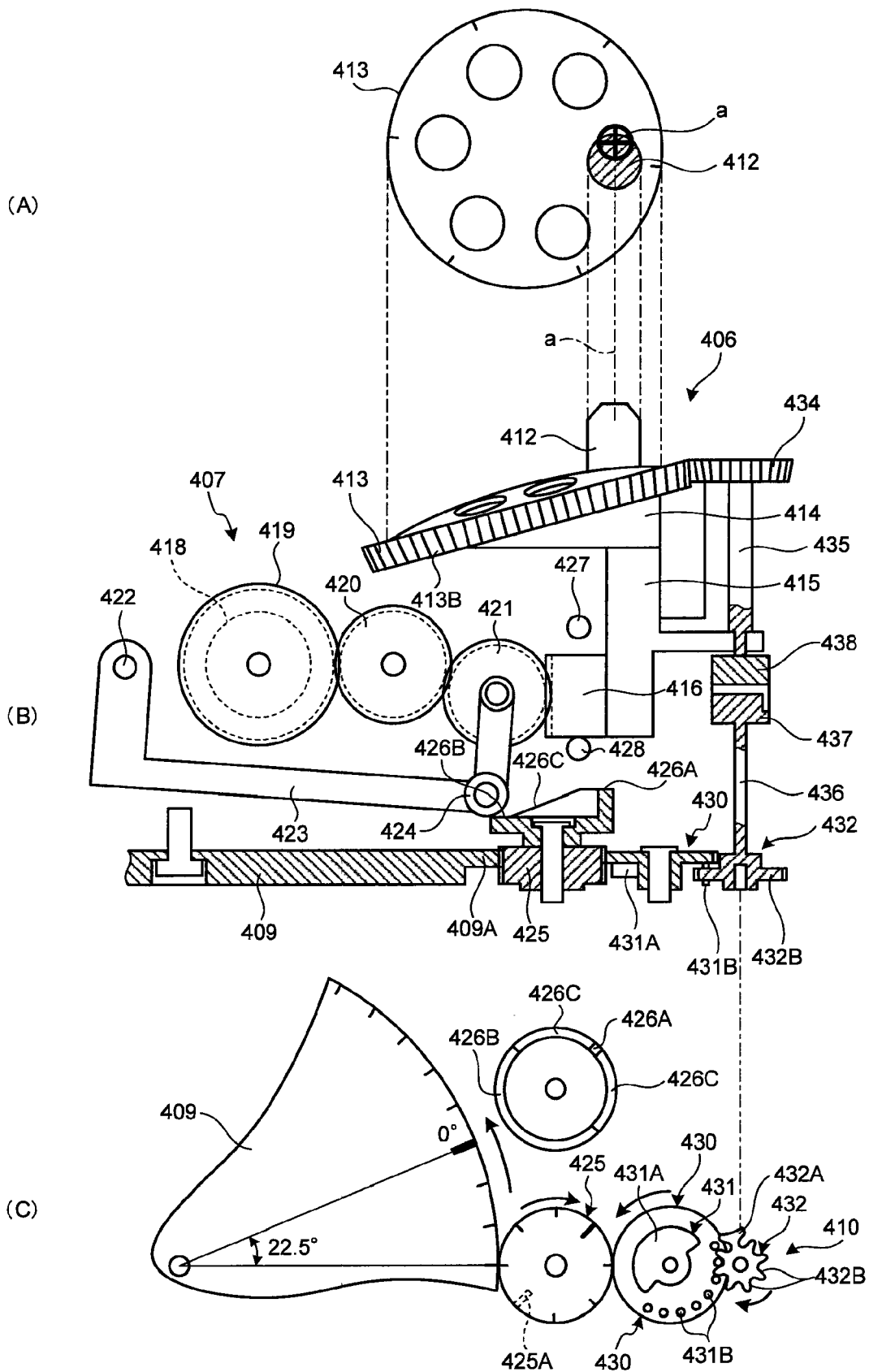

When the dial 409 is further rotated by 22.5 degrees as illustrated in FIG. 22, the pin portions 431B of the master 431 are engaged with the slave gear 432B of the slave 432 as illustrated in (C) of FIG. 22, so that the torque is transmitted to the slave 432 and the slave 432 is thereby rotated. As illustrated in (B) of FIG. 22, the rotation of the slave 432 is transmitted from the connecting portion 437 to the connected portion 438, so that the revolving-nosepiece rotating unit 413 is rotated via the main bevel gear 434 and the bevel portion 413B. As illustrated in (A) of FIG. 22, in this state, the objective lens 412 is being displaced from the position of the optical axis a in the rotation direction.

Figure 23:
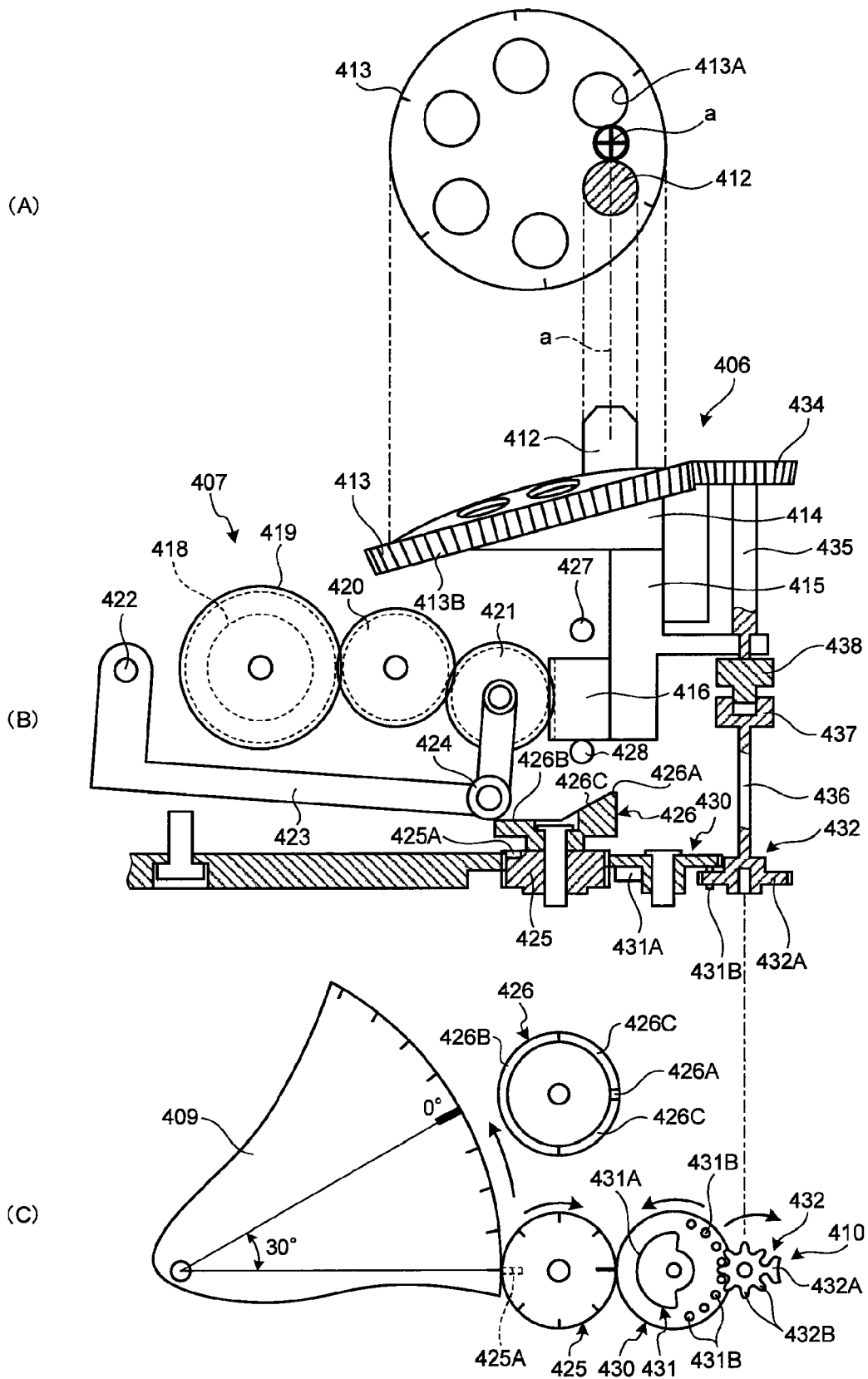

FIG. 23 illustrates a state in which the dial 409 is rotated by 30 degrees. As illustrated in (C) of FIG. 23, when the dial 409 is rotated by 30 degrees, the cam gear 425 rotates by 180 degrees. Accordingly, the master gear 430 also rotates by 180 degrees, so that the middle portion of the slave gear 432B is engaged with the middle portion of the pin portions 431B of the master gear 430.

In this state, as illustrated in (B) of FIG. 23, the pivot pin 424 is positioned on the bottom flat surface 426B of the cylindrical cam 426, so that the rack 416 is placed on the lower stopper 428. Therefore, the connected portion 438 and the connecting portion 437 are connected to each other. Furthermore, as illustrated in (A) of FIG. 23, the objective lens 412 is further moved away from the optical axis a in the rotation direction. At this time, the optical axis a is positioned in the middle between the objective lens 412 being moved away and the lens mounting hole 413A (the objective lens 412) being moved toward the position of the optical axis a.

When the dial 409 is further rotated to rotate the cam gear 425 by 270 degrees, the slave 432 rotates one turn by the master 431, so that the holding portion 431A of the master 431 and the held portion 432A of the slave 432 face each other. At this time, the revolving-nosepiece rotating unit 413 can move the objective lens 412 mounted in the next lens mounting hole 413A so as to be aligned along the optical axis a.

When the dial 409 is further rotated, the pivot pin 424 of the pivot gear box 423 is lifted up by the inclined surfaces 426C of the cylindrical cam 426. The pivot movement of the pivot pin 424 causes the pivot movement of the pivot gear box 423 and the pinion 421. Because the sliding resistance applied to the edge of the gear of the focusing handle 418 is sufficiently larger than the gravity applied to the focusing lift member 415, the spur gear 420 does not rotate and the pinion 421 rotates while performing revolution around the pivot axis 422 as the center of rotation. The rotation and revolution of the pinion 421 cause the rack 416 to be lifted up. The position of the rack 416, i.e., the position of the focusing lift member 415, is determined by the position of the pinion 421, whereas the spur gear 420 is not moved by the switching operation. Because the spur gear 420 is not moved, the pinion 421 is not moved relative to the rack 416. Because the pivot pin 424 is placed on the top flat surface 426A of the cylindrical cam 426, the position of the pivot pin 424 is determined by the position of the top flat surface 426A. Therefore, the position is accurately repeatable by a few μm order.

Thereafter, when the top flat surface 426A of the cylindrical cam 426 is positioned beneath the pivot pin 424, one cycle of rotation of the cam gear 425 is completed, so that return operation is completed in which the cylindrical head portion 429A of the leaf spring 429 is fitted in and engaged with the click groove 425A on the top surface of the cam gear 425, and the revolving-nosepiece rotating unit 413 is returned to the original position to come close to the specimen 402 placed on the stage 403.

The configuration, operation, and functions of the microscope 400 according to the fifth embodiment are described above. The following advantages are achieved according to this embodiment.

According to the fifth embodiment, the backlash of the gears is eliminated by using the gravity applied to the focusing lift member 415, so that the focusing operation can be performed by fine feed with good responsiveness, allowing for the focusing operation with good operability.

Furthermore, according to the fifth embodiment, the pivot gear box 423 is used as a retracting means, so that the switching can be performed with high repeatability by about a few μm even in the retraction and return operation accompanying the switching between the objective lenses 412. Furthermore, the configuration of this embodiment can be obtained only by adding a structure for pivoting the pinion to a normal microscope, so that the number of components is not increased. Therefore, it is possible to perform switching between the objective lenses along with the retraction and return of the objective lenses with reduced costs.

Moreover, according to the fifth embodiment, the sequential operation mechanism sequentially performs the retraction operation, the switching operation between the objective lenses, and the return operation, so that it is possible to perform switching while infallibly preventing the interference between the stage 403 and the objective lenses 412. Therefore, it is possible to relieve an operator of cumbersome operation accompanying the switching operation.

Furthermore, according to the fifth embodiment, the revolving-nosepiece rotating unit 413 can be switched by rotating the revolving nosepiece rotating unit itself in addition to the rotation operation performed by the switching entering unit. Therefore, it is possible to remove air for an oil-immersion objective lens without changing the focal point for the objective lenses 412, and reduce load on an operator for searching for specimen.

Sixth Embodiment

A microscope 400A according to a sixth embodiment of the present invention will be described below with reference to FIGS. 24 and 25. The microscope 400A of this embodiment is an inverted microscope. In this embodiment, components identical to those of the microscope 400 of the fifth embodiment described above are denoted by identical symbols, and components similar to those of the microscope 400 are denoted by similar symbols; therefore, explanation of these components is not repeated.

The microscope 400A of this embodiment includes, similarly to the fifth embodiment described above, the microscope main body 401, the specimen 402, the stage 403, the light source 404, the lens barrel 405, the objective-lens switching mechanism 406 for observing the specimen 402 by changing the observation magnification, a focusing mechanism 407A that moves the objective-lens switching mechanism 406 in the direction of the optical axis a of the microscope, a cam mechanism 408A as the retraction operation mechanism that largely moves the objective-lens switching mechanism 406 in the direction of the optical axis a of the microscope, the dial 409 as the switching entering unit for entering driving force for switching the objective lenses, the sequential operation mechanism 410 that sequentially causes the objective-lens switching mechanism 406 and the cam mechanism 408A to operate, and the driving-force transmission mechanism 411 that transmits the driving force from the sequential operation mechanism 410 to the objective-lens switching mechanism 406.

The objective-lens switching mechanism 406, the dial 409, the sequential operation mechanism 410, and the driving-force transmission mechanism 411 are identical to those of the fifth embodiment described above, and therefore, explanation thereof is not repeated. The focusing mechanism 407A and the cam mechanism 408A, which are different from the configuration of the fifth embodiment, are mainly explained below.

The focusing mechanism 407A includes a first guide 439 that is movable in the direction of the optical axis a of the microscope, and a second guide 440 constructed on the first guide 439. The first guide 439 is movable in the direction of the optical axis a of the microscope between the upper stopper 427 and the lower stopper 428. The first guide 439 and the second guide 440 are biased in the opposite direction so as to be separated from each other by a biasing spring 441 having elastic force. The focusing mechanism 407A of the sixth embodiment is different from that of the fifth embodiment described above in that it does not include the pivot gear box pivotally supported on the microscope main body 401.

Figure 24:
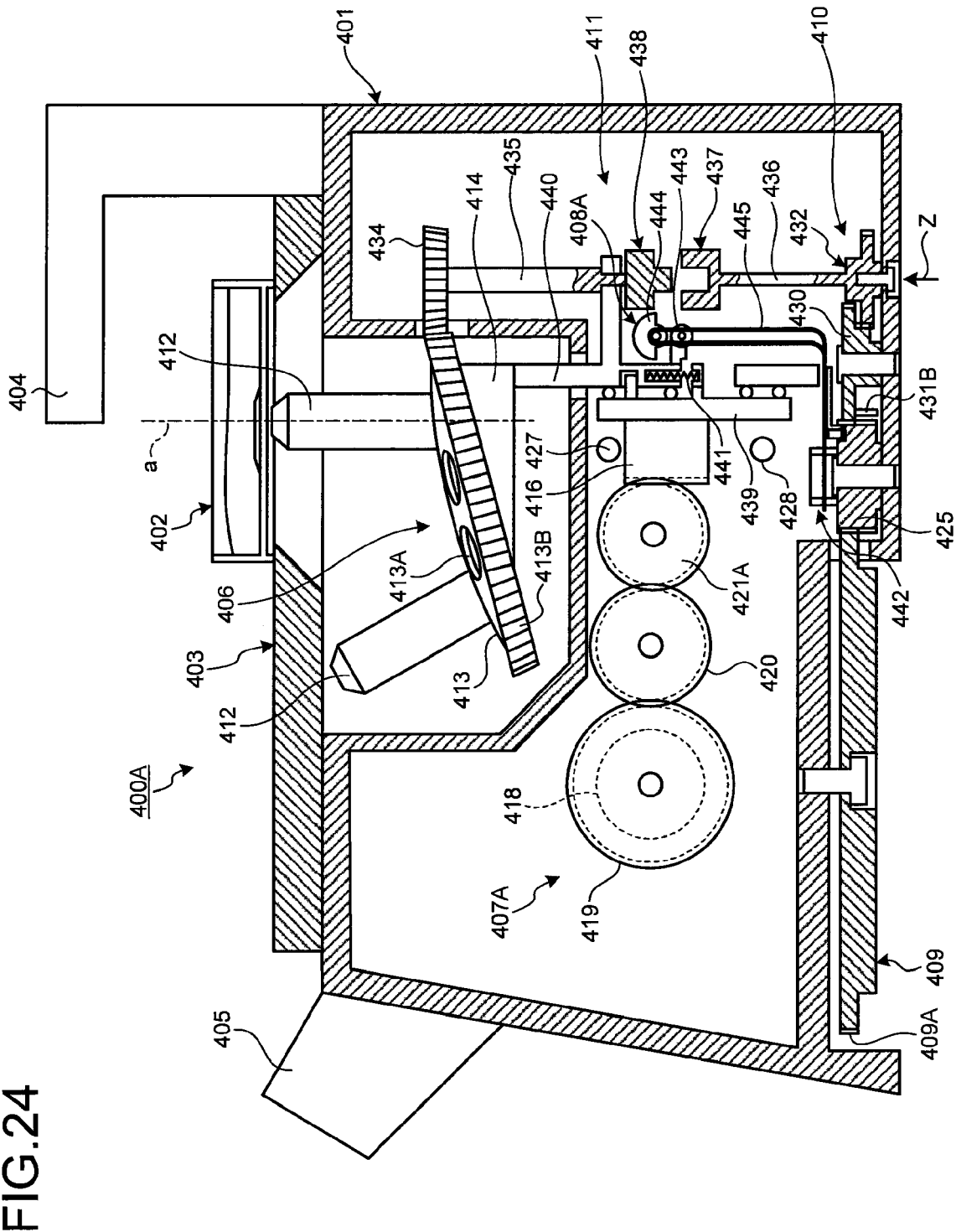
FIGS. 24 and 25 are diagrams illustrating a microscope according to a sixth embodiment of the present invention.
Figure 25:
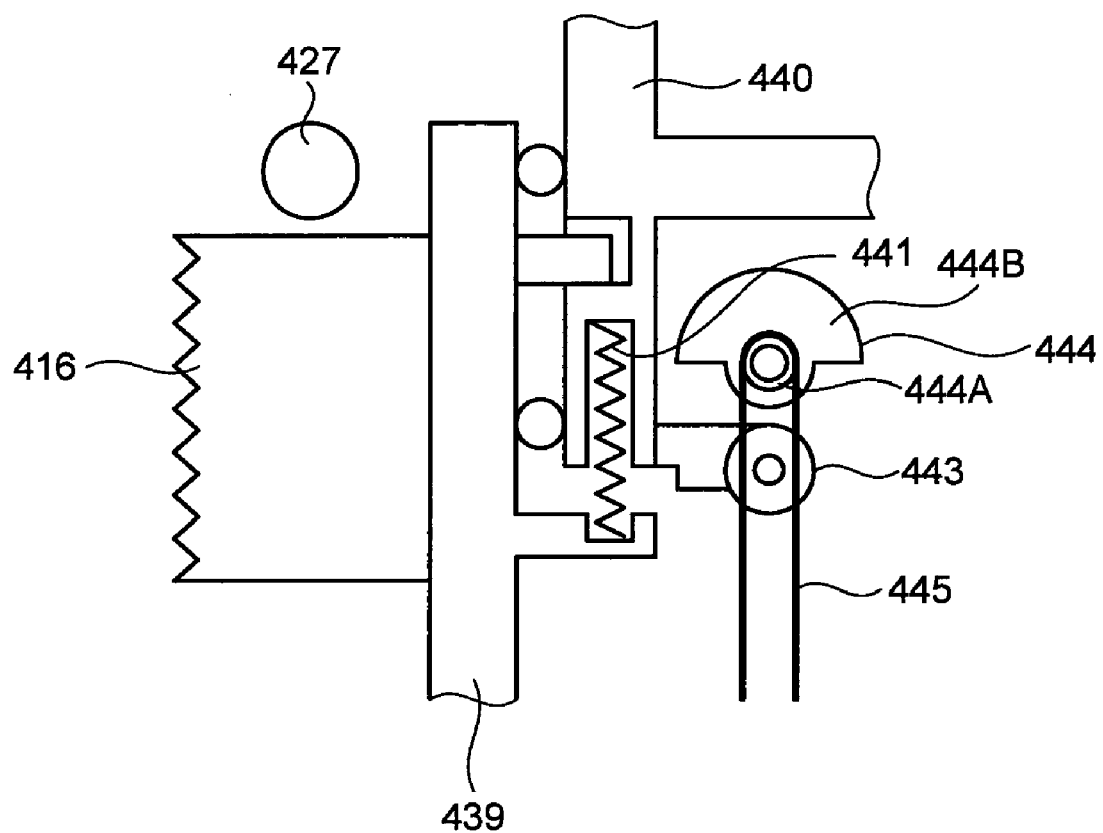

As illustrated in FIGS. 24 and 25, the cam mechanism 408A includes a cam pulley 442 fixed to the cam gear 425 and coaxial with the cam gear 425, an operation pin 443 rotatably supported by the second guide 440, a semicircular eccentric cam 444 rotatably supported on the microscope main body 401 at a position capable of being brought into contact with the operation pin 443, an eccentric cam pulley 444A fixed to the eccentric cam 444 and having the same number of teeth as that of the cam pulley 442, and a timing belt 445 that transmits the driving force from the cam pulley 442 to the eccentric cam pulley 444A.

The center of rotation of the eccentric cam 444 is positioned above the center of rotation of the operation pin 443. The shape of the eccentric cam 444 is set so that the eccentric cam 444 and the operation pin 443 do not come into contact with each other when the rack 416 arranged on the first guide 439 is positioned near the upper stopper 427. The shape of a semicircular portion 444B is set so that the bottom surface of the rack 416 arranged on the first guide 439 can be moved to a position approximately in contact with the lower stopper 428.

In the microscope 400A of the sixth embodiment with the above configuration, the second guide 440 is positioned on the upper side of the first guide 439 by the biasing spring 441 and is movable in a vertical direction by the focusing handle 418 in the state where the specimen 402 is observed (observation state). The backlash of a gear train of the focusing mechanism 407A is always pushed in one direction due to the gravity of the objective-lens switching mechanism 406, so that the backlash does not affect the responsiveness of the focusing handle 418.

For performing the retraction operation in the microscope 400A, similarly to the fifth embodiment, the dial 409 is rotated so that the engaged state between the click groove 425A of the cam gear 425 and the circular head portion of the leaf spring 429 can be released. Furthermore, in this embodiment, the order of performing the retraction operation of the objective-lens switching mechanism 406, the operation of maintaining the retracted state, the operation of switching the objective lenses 412 by rotating the objective-lens switching mechanism 406 during the retraction operation, and the operation of returning the objective-lens switching mechanism 406 back from the maintained state is identical to that of the microscope 400 of the fifth embodiment described above.

In the microscope 400A of the sixth embodiment with the above configuration, the backlash of the gears can be eliminated by using the first guide 439 that supports the weight of the objective-lens switching mechanism 406. Therefore, the focusing operation can be performed by fine feed with good responsiveness, allowing for the focusing operation with good operability.

Furthermore, according to the sixth embodiment, only the retraction operation is performed by the eccentric cam 444, so that the switching can be performed with high repeatability by about a few μm even in the retraction and return operation accompanying the switching between the objective lenses 412. Therefore, load of the focusing operation can be reduced.

Moreover, according to the sixth embodiment, the sequential operation mechanism 410 sequentially causes the objective-lens switching mechanism 406 and the cam mechanism 408A to operate, so that it is possible to perform switching while infallibly preventing the interference between the stage 403 and the objective lenses 412. Therefore, it is possible to relieve an operator of cumbersome operation accompanying the switching operation.

Furthermore, according to the sixth embodiment, the revolving-nosepiece rotating unit can be switched not only by the driving-force transmission mechanism 411 using an entering means but also by another method. Therefore, it is possible to remove air for an oil-immersion objective lens without changing the position of the specimen 402, and reduce load on an operator for searching for specimen.

Seventh Embodiment

Figure 26:
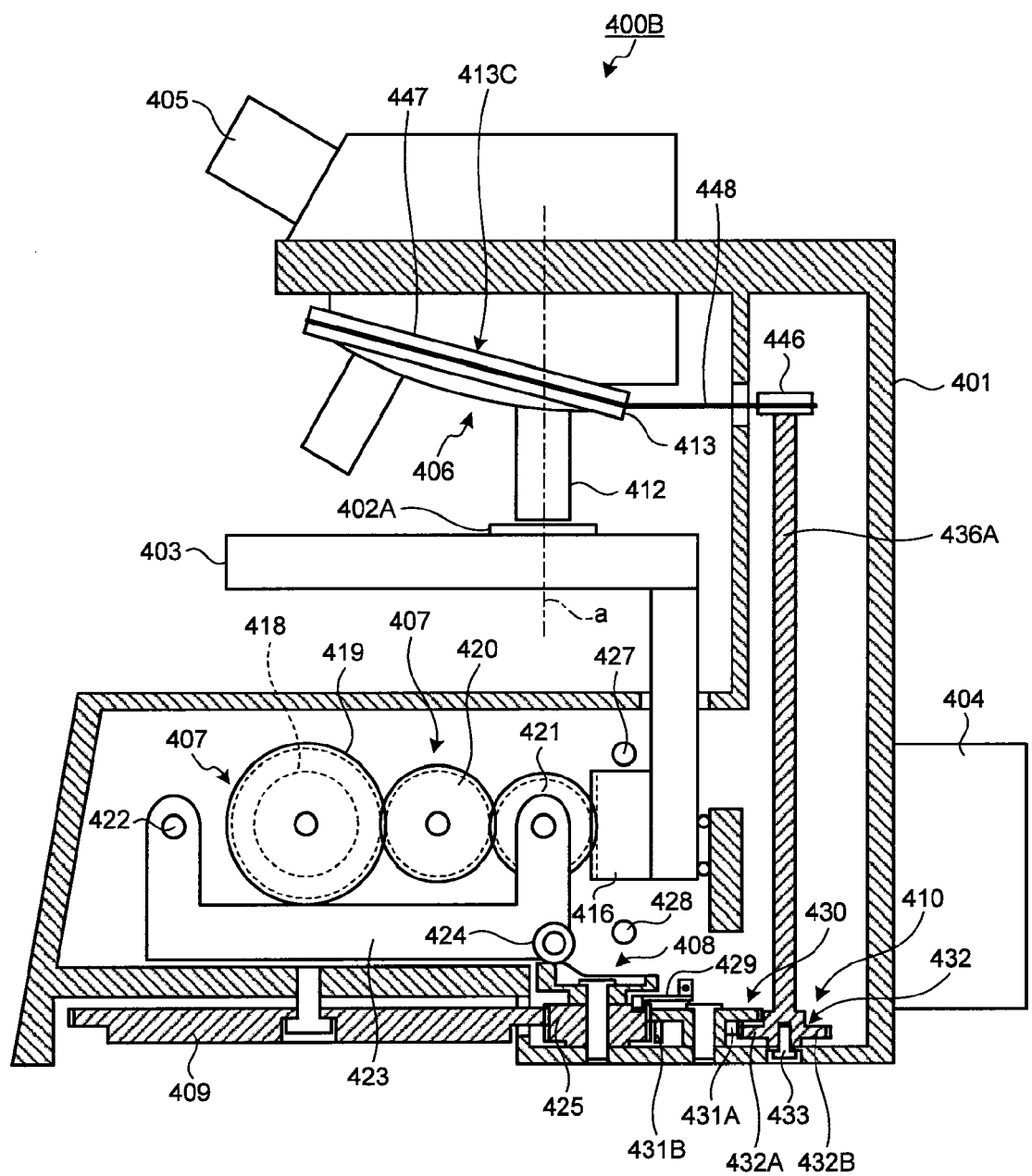
FIG. 26 is a diagram illustrating a microscope according to a seventh embodiment of the present invention.

FIG. 26 illustrates a microscope 400B according to a seventh embodiment of the present invention. The microscope 400B according to the seventh embodiment is an upright microscope. The microscope 400B of the seventh embodiment includes the cam mechanism 408 identical to that of the fifth embodiment described above, and the sequential operation mechanism 410. The configuration of the seventh embodiment is different from the fifth embodiment described above in that the stage 403 moves in the direction of the optical axis a and the objective-lens switching mechanism 406 is not lifted up and down. Therefore, only this feature of the seventh embodiment will be explained below. Components identical to those of the fifth embodiment are denoted by identical symbols, and components similar to those of the fifth embodiment are denoted by similar symbols; therefore, explanation of these components is not repeated.

The microscope 400B according to the seventh embodiment includes a slide specimen 402A formed of a slide glass, the stage 403 for placing the slide specimen 402A and that is movable in a two-dimensional direction orthogonal to the optical axis a of the microscope, the light source 404 for illuminating the slide specimen 402A, the lens barrel 405 for observing an enlarged image of the slide specimen 402A, the objective-lens switching mechanism 406 for observing the slide specimen 402A by changing the observation magnification, the focusing mechanism 407 that moves the stage 403 in the direction of the optical axis a of the microscope, the cam mechanism 408 that largely moves the stage 403 in the direction of the optical axis a of the microscope, the dial 409 as the switching entering unit for entering driving force for switching the objective lenses, and the sequential operation mechanism 410 that sequentially causes the objective-lens switching mechanism 406 and the cam mechanism 408 to operate.

The slave 432 of the sequential operation mechanism 410 includes the held portion 432A in the form of an epigastrium and is associated with the master 431, the slave gear 432B, and a slave shaft 436A that extends upward and is coaxial with the center of rotation of the slave 432. A slave pulley 446 is fixed to the top end of the slave shaft 436A. A revolving-nosepiece pulley 447 is formed on a rotational circumferential surface 413C of the revolving-nosepiece rotating unit 413 of the objective-lens switching mechanism 406, and driving force is transmitted via a belt 448 having elastic force between the revolving-nosepiece pulley 447 and the slave pulley 446.

While the configuration of the microscope 400B of the seventh embodiment is described above, a configuration other than the above is the same as that of the microscope 400 of the fifth embodiment describe above.

In the microscope 400B of the seventh embodiment, when entering operation is performed on the dial 409 as the switching entering unit, the cylindrical cam 426 in the cam mechanism 408 operates to thereby move the stage 403 downward in the direction of the optical axis a of the microscope, and thereafter, the sequential operation mechanism 410 transmits the driving force to the revolving-nosepiece rotating unit 413 of the objective-lens switching mechanism 406 to rotate the revolving-nosepiece rotating unit 413. After the rotation of the revolving-nosepiece rotating unit 413 ends, the sequential operation mechanism 410 brings the focusing mechanism 407 back to a position before the dial operation via the cylindrical cam 426. In such an upright microscope, because the revolving-nosepiece rotating unit 413 does not move in the direction of the optical axis a of the microscope, the microscope can be structured without the driving-force transmission mechanism 411 used in the fifth embodiment described above.

According to the seventh embodiment described above, in the microscope 400B, the same advantages as those of the microscope 400 of the fifth embodiment described above can be achieved. Furthermore, in the upright microscope, space between the objective lens 412 and the slide specimen 402A is about 0.1 mm, which is small. Therefore, it is possible to prevent the interference between the objective lens and the specimen by using the function of retracting the revolving nosepiece when the specimen is changed.

Eighth Embodiment

Figure 27:
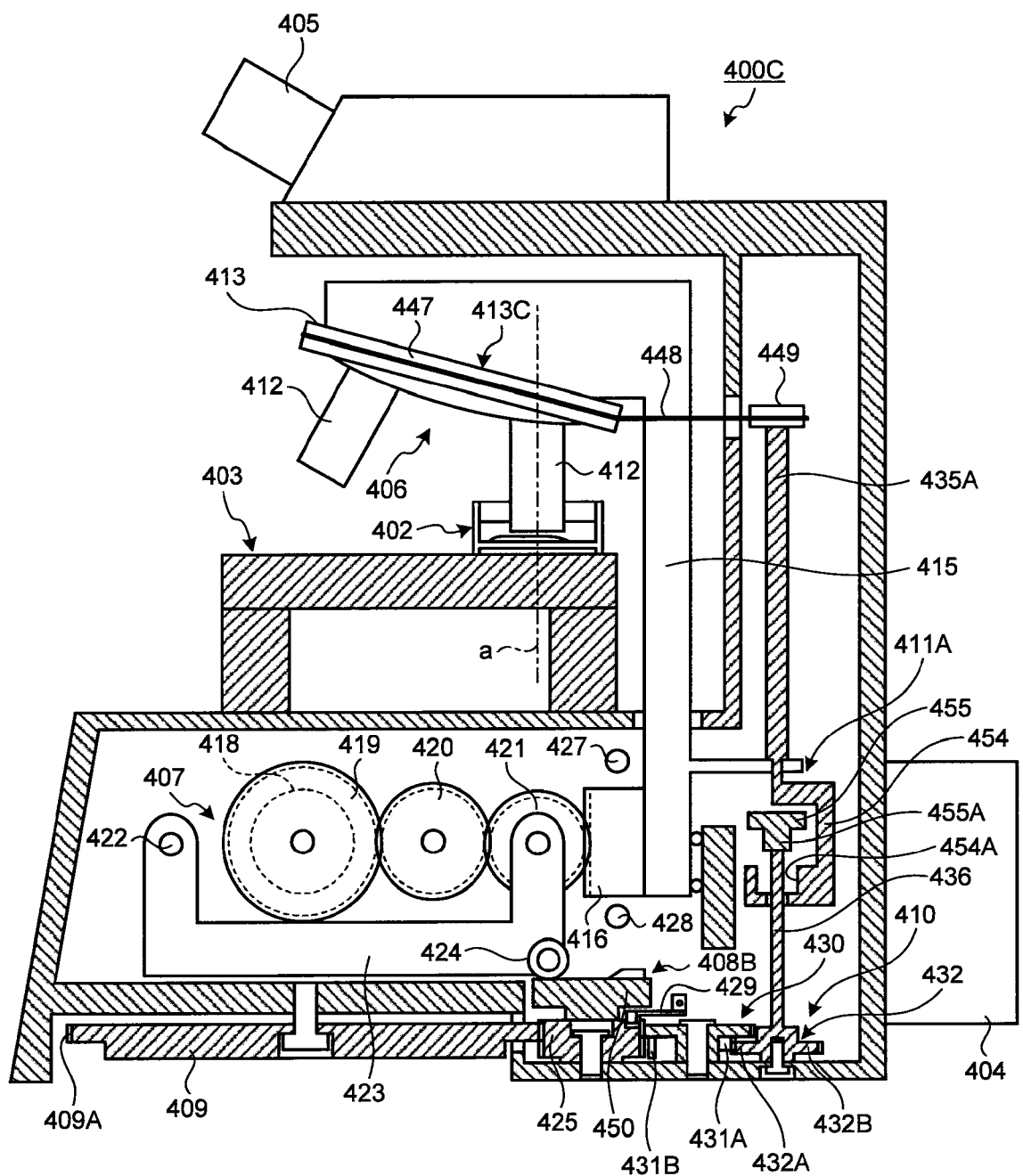
FIGS. 27 and 28 are diagrams illustrating a microscope according to an eighth embodiment of the present invention.
Figure 28:
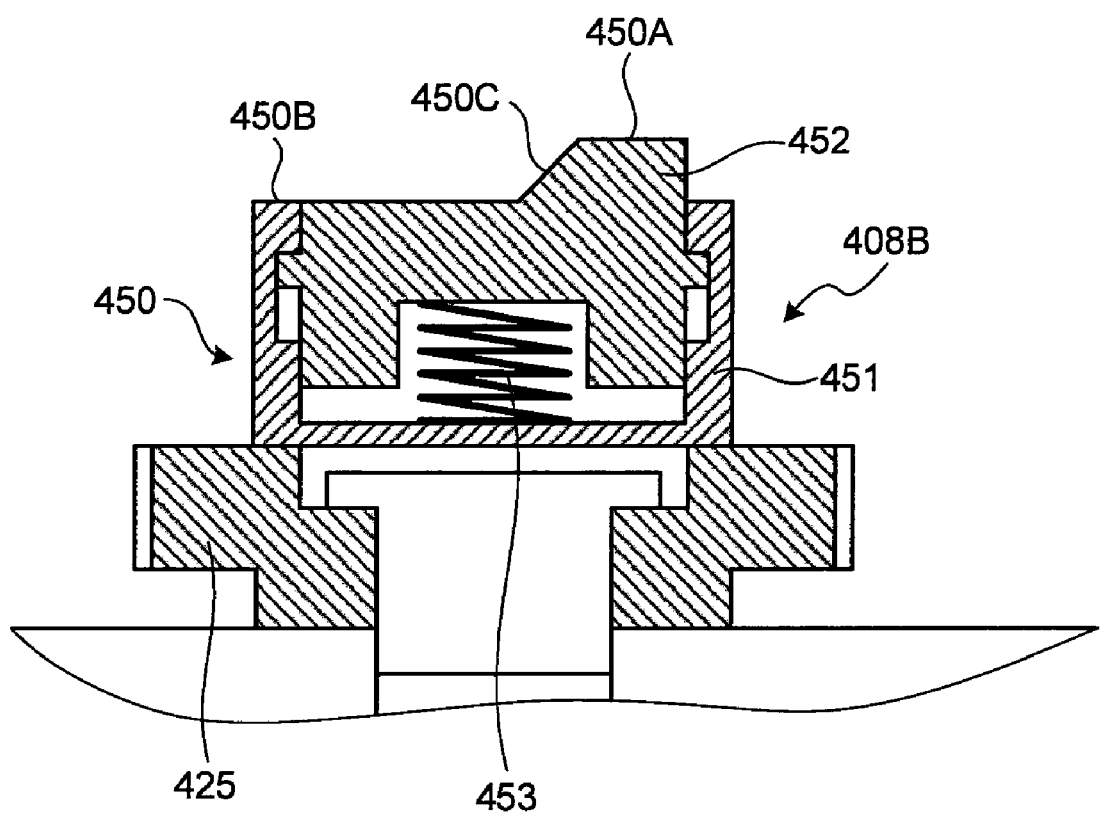

FIGS. 27 and 28 illustrate a microscope 400C according to an eighth embodiment of the present invention. In this embodiment, the configuration of the microscope 400 of the fifth embodiment described above is applied to a revolving-nosepiece lifting type upright microscope. In the microscope 400C of this embodiment, components identical to those of the fifth embodiment described above are denoted by identical symbols, and therefore, explanation thereof is not repeated.

The microscope 400C includes the specimen 402 formed of a bottom dish, the stage 403 for placing the specimen 402 and that is movable in a two-dimensional direction orthogonal to the optical axis a of the microscope, the light source 404 for illuminating the specimen 402, the lens barrel 405 for observing an enlarged image of the specimen 402, the objective-lens switching mechanism 406 for observing the specimen 402 by changing the observation magnification, the focusing mechanism 407 that moves the objective-lens switching mechanism 406 in the direction of the optical axis a of the microscope, a cam mechanism 408B that largely moves the objective-lens switching mechanism 406 in the direction of the optical axis a of the microscope, the dial 409 as the switching entering unit for entering driving force for switching the objective lenses, the sequential operation mechanism 410 that sequentially causes the objective-lens switching mechanism 406 and the cam mechanism 408B to operate, and a driving-force transmission mechanism 411A that transmits the driving force from the sequential operation mechanism 410 to the objective-lens switching mechanism 406. The objective-lens switching mechanism 406, the focusing mechanism 407, the cam mechanism 408B, the sequential operation mechanism 410, and the driving-force transmission mechanism 411A are identical to those of the fifth embodiment described above, and only different components will be described below.

The revolving-nosepiece pulley 447 is fixed to the rotational circumferential surface 413C of the revolving-nosepiece rotating unit 413 of the objective-lens switching mechanism 406, and a main drive pulley 449 is fixed to the top end of a revolving-nosepiece shaft 435A rotatably supported by the focusing lift member 415 along the direction of the optical axis a of the microscope. The revolving-nosepiece pulley 447 and the main drive pulley 449 are connected to each other via the belt 448 and driving force is transmitted therebetween. In the revolving-nosepiece lifting type upright microscope, the revolving nosepiece is retracted to the upper side. Therefore, a cylindrical cam 450 is disposed so that the shape thereof is inverted with respect to the cylindrical cam of the fifth embodiment described above. That is, in the observation state, a bottom flat surface 450B of the cylindrical cam 450 is positioned beneath the pivot pin 424 to support the pivot pin 424. When the retraction operation is performed, the pivot pin 424 slides against an inclined surface 450c of the cylindrical cam 450, so that the pivot pin 424 is lifted up and a top flat surface 450A is positioned beneath the pivot pin 424.

In this embodiment, as illustrated in FIG. 28, the cylindrical cam 450 is structured such that a cam body 452 is engaged with and supported by an outer cylinder 451 so as to prevent the cam body 452 from coming off, and the cam body 452 is biased by a biasing spring 453 in a direction along which the cam body 452 protrudes from the outer cylinder 451. The biasing force of the biasing spring 453 is set larger than the gravity applied to the focusing lift member 415. Therefore, when the cylindrical cam 450 is rotated to lift the pivot pin 424 up, the top surface of the rack 416 integrated with the focusing lift member 415 comes into contact with the upper stopper 427 by the biasing force of the biasing spring 453. In this state, even if the pivot pin 424 is further lifted up, only the biasing spring 453 is compressed, and therefore, the operation of retraction to a predetermined position can be performed.

Furthermore, in the microscope 400C according to the eighth embodiment, when entering operation is performed on the dial 409 as the switching entering unit, the cylindrical cam 450 as the retracting means operates to move the focusing lift member 415 upward in the direction of the optical axis a of the microscope, so that the revolving-nosepiece rotating unit 413 can be moved (retracted). By moving the focusing lift member 415 down, concave and convex of the driving-force transmission mechanism 411A are engaged with each other, so that driving force can be transmitted to the switching means. In this embodiment, as illustrated in FIG. 27, the driving-force transmission mechanism 411A is arranged so that the slave shaft 436 pierces through a concave portion 454A of a held portion 454 arranged at the bottom end of the revolving-nosepiece shaft 435A, and a connecting portion 455 having a protrusion 455A to be engaged with the concave portion 454A is arranged at the top end of the slave shaft 436. Therefore, in the driving-force transmission mechanism 411A, the driving force is transmitted to the objective-lens switching mechanism 406 to rotate the objective-lens switching mechanism 406 while the objective-lens switching mechanism 406 is being retracted. After the rotational switching of the revolving nosepiece ends, the cam mechanism 408B brings the focusing lift member 415 back to the original position before the dial operation by the rotation of the cylindrical cam 450.

The configuration and operation of the microscope 400C according to the eighth embodiment are described above. In this embodiment, the same advantages as those of the fifth embodiment described above can be achieved. The revolving-nosepiece lifting type upright microscope is used for observing living cell contained in the specimen 402 using the bottom dish, and the objective lenses 412 are positioned inside the bottom dish. Therefore, it is indispensable to retract the revolving nosepiece when the objective lenses are changed. With the configuration according to the eighth embodiment, the operability of the microscope can greatly be improved.

Ninth Embodiment

Figure 29:
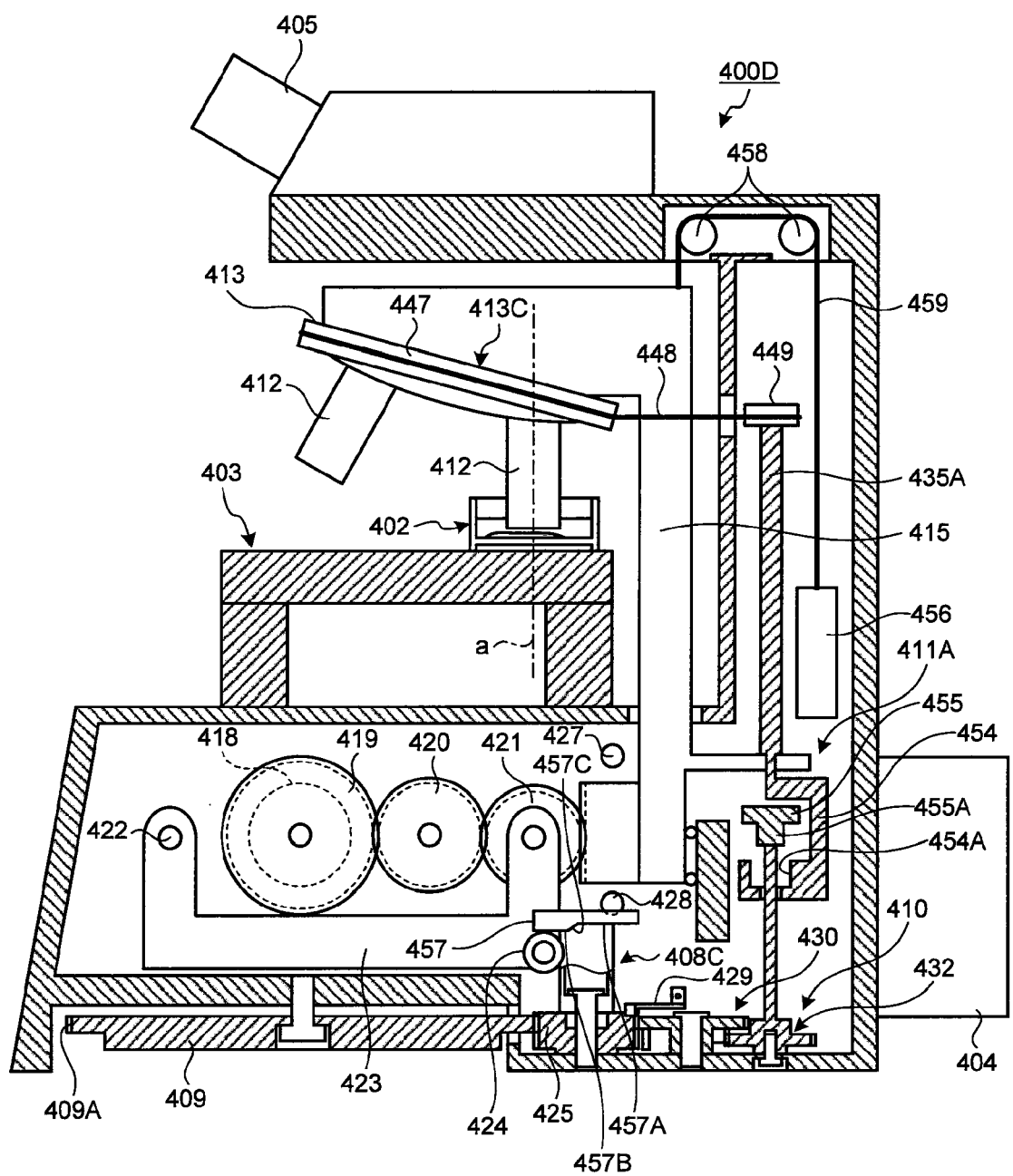
FIG. 29 is a diagram illustrating a microscope according to a ninth embodiment of the present invention.

FIG. 29 illustrates a microscope 400D according to a ninth embodiment of the present invention. The microscope 400D of the ninth embodiment is different from the microscope 400C of the eighth embodiment described above in that the configuration of the cam mechanism 408B is changed and force for always lifting the objective-lens switching mechanism 406 up is added by a weight 456. The other configuration is the same as that of the microscope 400 of the eighth embodiment, and therefore, only the differences will be described below.

In this embodiment, a cylindrical cam 457 is integrally formed on the cam gear 425 so as to be positioned above the pivot pin 424 in a cam mechanism 408C. A top flat surface 457A, a bottom flat surface 457B, and an inclined surface 457C are formed on a cam surface of the cylindrical cam 457. The focusing lift member 415 is connected to the weight 456 by a rope 459 passing through sheaves 458 rotatably (pivotally) supported on the microscope main body 401. The weight of the weight 456 is set so as to always lift the focusing lift member 415 up. When the top surface of the rack arranged on the focusing lift member 415 side comes into contact with the upper stopper 427, the pivot pin 424 is separated from the cam surface.

The microscope 400D according to the ninth embodiment can achieve the same advantages as those of the microscope 400C of the eighth embodiment described above. That is, in this embodiment, the revolving-nosepiece rotating unit 413 can automatically and largely be retracted to a predetermined position along with the switching operation of the objective lenses. Therefore, it is possible to allow a user to easily switch the objective lenses without regard to the retraction operation of the objective lenses. As a result, it is possible to prevent the objective lenses and the specimen from being damaged.

Other Embodiment

Although the embodiments of the present invention are described above, any descriptions and drawings as part of disclosure of the embodiments do not limit the scope of the present invention. Various other embodiments, examples, and operational techniques may be thought of by one skilled in the art based on this disclosure.

For example, in the above embodiments, as illustrated in FIG. 17, the master gear 430 having the master 431 and the slave 432 having the held portion 432A and the slave gear 432B are combined as the sequential operation mechanism 410 to perform sequential operation. However, the configuration is not limited to this example. It is sufficient to include a first gear to which the rotation is always transmitted from the dial 409 as the switching entering unit and a second gear that is selectively engaged with and driven with the first gear in a predetermined angular range around the center of the first gear. Therefore, any mechanisms that can perform sequential operation, such as a tooth-missing gear and a Geneve mechanism, other than the above may be applied. When, for example, the Geneva mechanism is employed, because the speed reduction ratio of the first gear to the second gear cannot be set to 1 to 1, the speed reduction ratio of the gear for transmitting rotation to the objective-lens switching mechanism 406 can appropriately be set.

Furthermore, although the cam mechanisms 408, 408A, 408B, and 408C are used as the retraction operation mechanism in the above embodiments, the present invention is not limited thereto. Any cam mechanisms having various other shapes or structures and mechanisms other than the cam mechanisms may be applied.

Moreover, the cylindrical pivot pin 424 is protruded as a pivot protrusion on the pivot gear box 423 in the fifth and the seventh to ninth embodiments. However, the pivot protrusion is not limited to this example. Other components having other shapes or structures capable of sliding or rolling against the cam surface may be applied.

What is claimed is:
1. A microscope comprising:
an objective-lens switching mechanism equipped with a plurality of objective lenses and configured to rotate to switch from one objective lens positioned on an optical axis to another objective lens among the plurality of objective lenses;
a stage for placing a specimen;
a switching entering unit that enters a driving force for rotating the objective-lens switching mechanism to switch the objective lenses;
a retraction operation mechanism that, along with operation of the switching entering unit, performs a retraction operation for increasing a relative distance between the objective-lens switching mechanism and the stage in an optical axis direction, a maintaining operation for main- taining a state in which the relative distance is increased, and a return operation for shortening the relative distance; and a sequential operation mechanism that is selectively driven along with the operation of the switching entering unit to thereby rotate the objective-lens switching mechanism for switching the objective lenses during the maintaining operation performed by the retraction operation mechanism.

2. The microscope according to claim 1, wherein the sequential operation mechanism includes a first gear to which the operation of the switching entering unit is always transmitted, and a second gear that is selectively engaged with and driven with the first gear in a predetermined angular range around the center of the first gear, and rotation of the second gear is transmitted to the objective-lens switching mechanism.

3. The microscope according to claim 2, wherein the first gear is a pin gear having a plurality of pins disposed in a circumferential direction within a predetermined angular range around the center of the first gear, and the second gear is a gear sequentially engaged with the pins of the pin gear.

4. The microscope according to claim 1, wherein the retraction operation mechanism is a cam mechanism that includes a cam that causes a pivot protrusion, which moves along with the objective-lens switching mechanism, or a pivot protrusion, which moves along with the stage, to follow a cam surface, and that sequentially performs the retraction operation, the maintaining operation, and the return operation along with rotation of the cam.

5. The microscope according to claim 4, further comprising:

a rack having teeth which is fixed to the objective-lens switching mechanism and the stage so that the teeth are aligned in a direction of the optical axis;

a focusing mechanism that includes a pivot frame that is pivotally supported by a microscope main body at one end thereof, includes a pinion engaged with the rack at the other end thereof, and is configured to pivot along a direction approximately the same as the direction of the optical axis while the pinion is engaged with the rack; and a reduction mechanism that includes at least one spur gear supported by the microscope main body and engaged with the pinion, wherein the focusing mechanism moves the objective lens on the optical axis or the stage along the direction of the optical axis for fine adjustment, and the pivot protrusion is arranged on the other end of the pivot frame.

6. The microscope according to claim 1, wherein the sequential operation mechanism includes a first driving-force transmission shaft that is selectively driven along with the operation of the switching entering unit, and the objective-lens switching mechanism includes a second driving-force transmission shaft that is connected to the first driving-force transmission shaft to transmit rotation driving force to the objective-lens switching mechanism while the retraction operation mechanism performs the maintaining operation on one of the objective-lens switching mechanism and the stage.

7. The microscope according to claim 1, wherein the retraction operation mechanism moves only the stage in the optical axis direction, and the sequential operation mechanism is directly connected to the objective-lens switching mechanism so as to be always driven along with the objective-lens switching mechanism.

* * * * *